(12) United States Patent
Inoguchi et al.

(10) Patent No.: US 10,604,153 B2
(45) Date of Patent: Mar. 31, 2020

(54) VEHICLE TRAVELING CONTROL APPARATUS

(71) Applicant: TOYOTA JIDOSHA KABUSHIKI KAISHA, Toyota-shi, Aichi (JP)

(72) Inventors: Takeshi Inoguchi, Chiryu (JP); Keiji Yamashita, Nisshin (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 46 days.

(21) Appl. No.: 15/702,402

(22) Filed: Sep. 12, 2017

(65) Prior Publication Data

US 2018/0079411 A1    Mar. 22, 2018

(30) Foreign Application Priority Data

Sep. 21, 2016    (JP) .................................. 2016-184456

(51) Int. Cl.
*B60W 30/14*    (2006.01)
*B60W 50/14*    (2020.01)
*B60W 50/00*    (2006.01)

(52) U.S. Cl.
CPC ........ *B60W 30/146* (2013.01); *B60W 30/143* (2013.01); *B60W 50/14* (2013.01); *B60W 2050/0066* (2013.01); *B60W 2050/146* (2013.01); *B60W 2540/04* (2013.01); *B60W 2550/22* (2013.01); *B60W 2550/402* (2013.01)

(58) Field of Classification Search
CPC combination set(s) only.
See application file for complete search history.

(56) References Cited

U.S. PATENT DOCUMENTS 5,774,820 A * 6/1998 Linden ................. B60K 31/047
                                                    180/179
2012/0253628 A1    10/2012 Maruyama

FOREIGN PATENT DOCUMENTS

| JP | H10-151967 A | 6/1998 |
| JP | 2012-086803 A | 5/2012 |
| JP | 2012-206594 A | 10/2012 |

* cited by examiner

*Primary Examiner* — Adam D Tissot
*Assistant Examiner* — Edward J Pipala
(74) *Attorney, Agent, or Firm* — Oliff PLC

(57) ABSTRACT

A driving assist ECU calculates a speed deviation ΔV which is a magnitude of a deviation between a target speed Vset and a speed limit Vlim in a situation in which the target speed Vset and the speed limit Vlim are different from each other. When the speed deviation ΔV is equal to or smaller than a threshold A, the driving assist ECU sets an accept prohibition flag to "1". When the speed deviation ΔV is higher than the threshold A, the driving assist ECU sets the accept prohibition flag to "0". When the accept prohibition flag is "1", the driving assist ECU regards/treats a long-push operation of an operating unit not as an accept operation, but as an acceleration operation or a coast operation.

6 Claims, 11 Drawing Sheets

<EMBODIMENT>

<COMPARATIVE EXAMPLE>

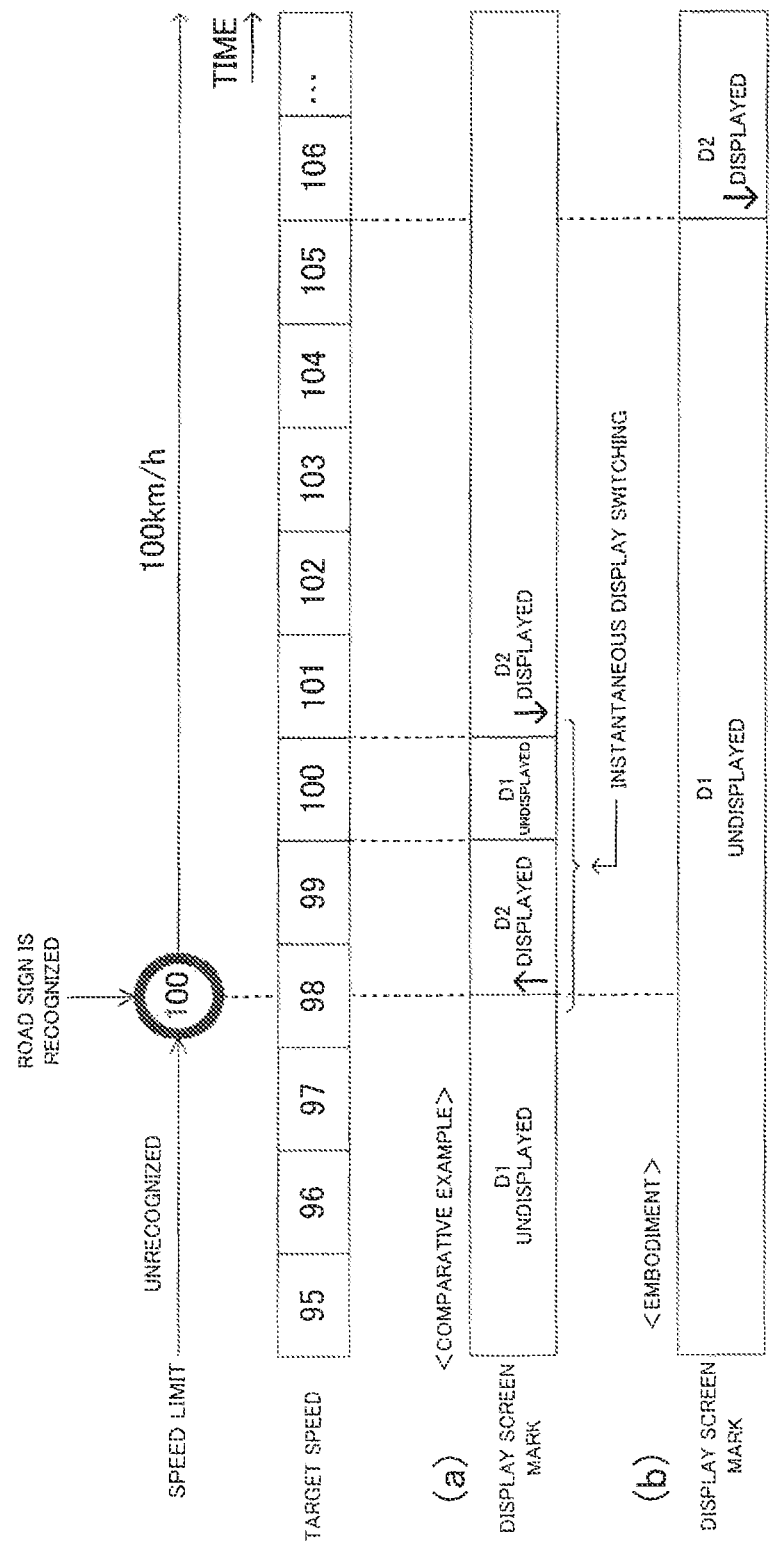

VEHICLE TRAVELING CONTROL APPARATUS

BACKGROUND OF THE INVENTION

1. Field of the Invention

The present invention relates to a vehicle traveling control apparatus which acquires a speed limit of a road on which an own vehicle travels, and which controls a travel of the own vehicle based on the speed limit.

2. Description of the Related Art

One of vehicle traveling control apparatuses that are conventionally known acquires a speed limit of a road on which an own vehicle travels, and sets a target speed of the own vehicle to the speed limit, to thereby keep the own vehicle traveling at a constant speed which is equal to the speed limit. Such a vehicle traveling control apparatus acquires the speed limit of the road on which the own vehicle travels, by obtaining an image of a road sign ahead of the own vehicle with a camera, or based on speed limit information included in map data of a navigation apparatus.

When a vehicle travel control apparatus has own vehicle travel at a constant speed, it is not necessarily preferable to have the vehicle travel at the speed limit. For this reason, for example, an apparatus (hereinafter, referred to as a "conventional apparatus 1") disclosed in Japanese Patent Application Laid-Open (kokai) 2012-206594 A is configured to enable a driver to select whether or not the target speed of the own vehicle is set to the speed limit, by a switch operation of the driver.

In a situation in which the target speed and the speed limit are different from each other, the conventional apparatus 1 displays the target speed and the speed limit on a display device. When a specific operation of an operating unit is detected in the above situation, the conventional apparatus 1 sets the target speed of the own vehicle to the speed limit. Therefore, the driver can keep the own vehicle traveling at a constant speed in accordance with the speed limit.

SUMMARY OF THE INVENTION

The conventional apparatus 1 adopts the speed limit as the target speed for a vehicle which implements a cruise control for keeping the own vehicle traveling at a constant speed in accordance with an arbitrary target speed. The vehicle which implements the cruise control is equipped with an operating unit used by the driver to freely increase/decrease the target speed. In the conventional apparatus 1, the operating unit also serves as an operating unit used by the driver to set the target speed to the speed limit. In this configuration, regarding a specific operation performed in the situation in which the target speed and the speed limit are different from each other, the specific operation is treated not as an operation for increasing/decreasing the target speed, but as an operation for setting the target speed to the speed limit.

For this reason, the target speed may be set in a manner different from the intention of the driver. For example, in a case where a difference between the current target speed and the speed limit is small, when the operating unit is operated toward a side bringing the target speed closer to the speed limit, the operation is considered to be based on the intention of the driver to increase or decrease the target speed. If the operation in this situation is treated as the operation for setting the target speed to the speed limit, the target speed may be set in a manner different from the intention of the driver.

The present invention is made to cope with the problem described above. That is, one of objects of the present invention is to reduce a possibility that the target speed is set in a manner different from the intention of the driver.

In order to achieve the object, a vehicle traveling control apparatus according to an aspect of the present invention includes:

cruise control means (10, 30, 40) for executing a cruise control for keeping an own vehicle traveling at a constant speed in accordance with a target speed without an accelerator pedal operation by a driver;

an operating unit (70) which is operated by the driver to increase or decrease the target speed to an arbitrary value;

speed limit acquisition means (20, 21, 22) for acquiring a speed limit of a road on which the own vehicle travels;

display means (50, 51) for displaying the target speed and the speed limit on a display device;

target speed setting means (10) for performing a first function (S36) to increase or decrease the target speed by an amount corresponding to an operation of the operating unit, and a second function (S38) to set the target speed to the speed limit by an operation of the operating unit, wherein the target speed setting means is configured to set the target speed through the second function in place of the first function when the operating unit is operated toward a side bringing the target speed closer to the speed limit in a situation in which the speed limit and the target speed are different from each other (S37: Yes);

speed deviation acquisition means (S14, S15) for acquiring a speed deviation which is a magnitude of a deviation between the speed limit and the target speed; and prohibition means (S17, S35) for prohibiting the target speed setting means from setting the target speed through the second function when the speed deviation is equal to or smaller than a predetermined threshold which is larger than zero (S16: Yes).

The vehicle traveling control apparatus according to the aspect of the present invention includes the cruise control means for executing the cruise control for keeping the own vehicle traveling at a constant speed in accordance with (or equal to) the desired target speed without operating the accelerator pedal by the driver, and is configured to set the target speed for the cruise control to the speed limit through an operation of the driver. For this reason, the vehicle traveling control apparatus includes the operating unit, the speed limit acquisition means, the display means, and the target speed setting means.

The operating unit is operated by the driver to adjust (i.e., increase or decrease) the target speed to an arbitrary value. The speed limit acquisition means acquires the speed limit of the road on which the own vehicle travels. The display means displays the target speed and the speed limit on the display device. Therefore, the driver can recognize the target speed and the speed limit.

The target speed setting means realizes (performs) the first function to increase or decrease the target speed by the amount corresponding to an operation of the operating unit, and the second function to set the target speed to the speed limit by an operation of the operating unit. The target speed setting means sets/determines the target speed through the second function in place of the first function, when the operating unit is operated toward a side bringing the target speed closer to the speed limit in a situation in which the speed limit and the target speed are different from each other.

Therefore, the operating unit serves as both an operating unit for increasing or decreasing the target speed to a speed desired by the driver, and as an operating unit for setting the target speed to the speed limit. The expression of "setting the target speed to the speed limit" can be rephrased with an expression of "permitting the speed limit to be set as the target speed".

For example, when the speed limit is higher than the target speed and the operating unit is operated toward a side for increasing the target speed, the target speed setting means may use the second function. When the speed limit is higher than the target speed and the operating unit is operated toward a side for decreasing the target speed, the target speed setting means may use the first function. On the other hand, when the speed limit is less than the target speed and the operating unit is operated toward the side for increasing the target speed, the target speed setting means may use the first function. When the speed limit is less than the target speed and the operating unit is operated toward the side for decreasing the target speed, the target speed setting means may use the second function. When the speed limit is equal to the target speed, the target speed setting means may use the first function.

Regarding the vehicle traveling control apparatus which sets the target speed in the above manner, in a situation in which a magnitude of a difference between the target speed and the speed limit is lower than a certain value, when the operating unit is operated toward the side for bringing the target speed closer to the speed limit, it is considered that the operation is based on the intention of the driver to increase or decrease the target speed. For this reason, if the operation in this situation is treated/regarded as the operation for setting the target speed to the speed limit, the target speed may be set in a manner different from the intention of the driver. Further, if the speed limit is set as the target speed in this situation, since the magnitude of the difference between the target speed and the speed limit is small, the change amount of the target speed is small. This may cause a problem that the target speed is set in a manner different from the expectation of the driver. For solving those problems, the present invention includes the speed deviation acquisition means and the prohibition means.

The speed deviation acquisition means acquires the speed deviation which is a magnitude of the deviation between the speed limit and the target speed. When the speed deviation is equal to or less than the threshold which is higher than zero, the prohibition means prohibits the target speed setting means from setting the target speed through using the second function. That is, in a situation in which the speed deviation is not only zero, but also equal to or less than the threshold which is higher than zero, the prohibition means prohibits the target speed setting means from setting the target speed through using the second function. Therefore, in this situation, the target speed setting means sets the target speed through using the first function. Accordingly, the aspect of the present Invention can reduce the possibility that the target speed is set in a manner different from the intention of the driver.

It should be noted that the speed deviation may be a value obtained by subtracting the target speed from the speed limit when the speed limit is higher than the target speed. In addition, the speed deviation may be a value obtained by subtracting the speed limit from the target speed when the speed limit is less than the target speed. Alternatively, an absolute value of the difference between the speed limit and the target speed may be used as the speed deviation.

In an aspect of the present invention, the first function is a function to increase or decrease the target speed by a predetermined change amount every time a certain time elapses while a push operation of the operating unit continues after a long-push operation is detected, wherein the long-push operation is a push operation of the operating unit which continues for a long-push completion time, and the second function is a function to set the target speed to the speed limit when the long-push operation of the operating unit is detected.

The target speed setting means of the above aspect of the present invention sets the target speed using the first function or the second function. Therefore, when the speed deviation is equal to or less than the threshold, the target speed setting means increases or decreases the target speed by the predetermined change amount every time the certain time elapses while the push operation of the operating unit continues for the long-push completion time or more. Therefore, the driver can increase or decrease the target speed to a desired value by one-time long-push operation of the operating unit without being affected by the speed limit. As a result, according to the aspect of the present invention, it is possible to set the target speed in a manner consistent (along) with the intention of the driver. Further, operability of the operating unit can be improved.

In another aspect of the present invention, the target speed setting means is configured, when it sets the target speed through the first function:

to increase or decrease the target speed by the predetermined change amount in such a manner that the target speed becomes one of multiples of the predetermined change amount; and to set the target speed to a value which is closest to one of the multiples in a changing direction of the target speed, if the target speed at a time point of starting the push operation of the operating unit is not one of the multiples.

In addition, the threshold is set to be a value which is the same as the predetermined change amount.

According to the above aspect of the present invention, the target speed first is set to be the same value as the speed limit, when the speed deviation is equal to or less than the threshold and the driver performs the long-push operation of the operating unit. Thereafter, if the long-push operation of the operating unit is continued, the target speed is increased or decreased by the predetermined change amount every time the predetermined time elapses. Therefore, the driver who wants to set the target speed to an arbitrary value can set the target speed to a desired value by the one-time long-push operation. Further, the driver who wants to set the target speed to the speed limit can set the target speed to the speed limit by terminating the long-push operation at a time point at which the target speed has reached a value which is the same as the speed limit. Therefore, both types of the drivers can set the target speed by the one-time long-push operation in a manner consistent with (along with) the desire of the driver. This can further improve the operability of the operating unit.

Another aspect of the present invention further includes threshold adjustment means for changing the threshold to one of values including at least zero in response to an operation of the driver.

According to the aspect of the present invention, it is possible to change the threshold to zero in accordance with the preference of the driver. When zero is set as the threshold, the prohibition means cannot function. Therefore, the driver who wants to set the target speed to the speed limit even when the target speed is close to the speed limit can set the target speed in accordance with the desire of the driver when setting the threshold to zero. In other words, this aspect can flexibly respond to the preference of the driver.

In another aspect of the present invention, the operating unit is configured to perform a function to stop the cruise control in response to an operation of the driver and a function to restart the cruise control which has been stopped, in response to an operation of the driver.

The target speed setting means of the aspect is configured to:

store the target speed at a time point at which the cruise control is stopped;

set the target speed at a time point at which the cruise control is restarted to the speed limit, when the cruise control is restarted in response to the long-push operation of the operating unit (S43:Yes, S46); and set the target speed at the time point at which the cruise control is restarted to the stored target speed, when the cruise control is restarted in response to a short-push operation of the operating unit which is a push operation which is terminated before the long-push completion time elapses (S42:No, S44).

According to the above aspect of the present invention, when the driver stops/terminates the cruise control by operating the operating unit, the target speed setting means stores the target speed at the time of stopping the cruise control. The driver can restart the cruise control by operating the operating unit. When the operation of the operating unit for restarting the cruise control is the long-push operation, the speed limit is set as the target speed at the time of restarting the cruise control. On the other hand, when the operation of the operating unit for restarting the cruise control is the short-push operation, the target speed which was stored at the time of stopping the cruise control is set as the target speed at the time of restarting the cruise control.

Therefore, the driver can utilize the operation for restarting the cruise control to select the target speed at the time of restarting the cruise control from any one of the target speed at the time of stopping the cruise control and the speed limit detected by the speed limit acquisition means. Therefore, the driver who attempts to keep the own vehicle traveling at a constant speed in accordance with the speed limit does not need to perform an additional operation for setting the target speed to the speed limit. As a result, the aspect of the present invention can improve the usability/operability.

In another aspect of the present invention, the vehicle traveling control apparatus includes:

display control means (10, S25, 50) for displaying on the display device an operation Instruction Indicating operation procedures of the operating unit for setting the target speed to the speed limit (i.e., operation instruction on how to operate the operating unit for setting the target speed to the speed limit); and display prohibition means (10, S24:Yes, S23) for prohibiting the display control means from displaying the operation instruction when the speed deviation is equal to or smaller than the threshold.

According to the above aspect of the present invention, since the operation instruction on how to operate the operating unit for setting the target speed to the speed limit is displayed, the driver can easily set the target speed to the speed limit with the operating unit. Further, when the speed deviation is equal to or less than the threshold, the speed limit cannot be set as the target speed. In accordance with this limitation, the operation instruction on how to operate the operating unit for setting the target speed to the speed limit is not displayed. Therefore, it is possible to prevent the driver from feeling discomfort.

Further, still another aspect of the present invention may be a vehicle traveling control apparatus which sets an upper speed limit of the own vehicle to the speed limit.

The vehicle traveling control apparatus includes:

vehicle speed control means for controlling a driving force and a braking force of an own vehicle in such a manner that a vehicle speed of the own vehicle does not exceed the upper speed limit (upper limit for ASL);

an operating unit which is operated by the driver to increase or decrease the upper speed limit to an arbitrary value;

speed limit acquisition means for acquiring a speed limit of a road on which the own vehicle travels;

display means for displaying the upper speed limit and the speed limit on a display device;

upper speed limit setting means for performing a first function to increase or decrease the upper speed limit by an amount corresponding to an operation of the operating unit, and a second function to set the upper speed limit to the speed limit through an operation of the operating unit, wherein the upper speed limit setting means is configured to set the upper speed limit through the second function in place of the first function when the operating unit is operated toward a side bringing the upper speed limit closer to the speed limit in a situation in which the speed limit and the upper speed limit are different from each other;

speed deviation acquisition means for acquiring a speed deviation which is a magnitude of a deviation between the speed limit and the upper speed limit; and prohibition means for prohibiting the upper speed limit setting means from setting the upper speed limit through the second function when the speed deviation is equal to or smaller than a predetermined threshold which is larger than zero.

The vehicle traveling control apparatus according to the above aspect includes the vehicle speed (limiting) control means for controlling the driving force and the braking force of the own vehicle such that the vehicle speed of the own vehicle does not exceed the upper speed limit. The vehicle traveling control apparatus is configured to set the upper speed limit to the speed limit through an operation of the driver. For this reason, the vehicle traveling control apparatus includes the operating unit, the speed limit acquisition means, the display means, and the upper speed limit setting means.

The operating unit is an operating unit for increasing or decreasing the upper speed limit to an arbitrary value. The speed limit acquisition means acquires the speed limit of the road on which the own vehicle travels. The display means displays the upper speed limit and the speed limit on the display device. Therefore, the driver can recognize the upper speed limit and the speed limit.

The upper speed limit setting means realizes the first function to increase or decrease the upper speed limit by the amount corresponding to an operation of the operating unit, and the second function to set the upper speed limit to the speed limit by an operation of the operating unit. Further, the upper speed limit setting means is configured to set the upper speed limit by using the second function as substitute for the first function when the operating unit is operated toward the side for bringing the upper speed limit closer to the speed limit in the situation in which the speed limit and the upper speed limit are different from each other. Therefore, the operating unit serves as both an operating unit for increasing or decreasing the upper speed limit to a speed which the driver desires, and as an operating unit for setting the upper speed limit to the speed limit. The expression of "setting the upper speed limit to the speed limit" can be rephrased with an expression of "permitting the speed limit to be set as the upper speed limit".

For example, when the speed limit is higher than the upper speed limit and the operating unit is operated toward a side for increasing the upper speed limit, the upper speed limit setting means may use the second function. When the speed limit is higher than the upper speed limit and the operating unit is operated toward a side for decreasing the upper speed limit, the upper speed limit setting means may use the first function. On the other hand, when the speed limit is less than the upper speed limit and the operating unit is operated toward the side for increasing the upper speed limit, the upper speed limit setting means may use the first function. When the speed limit is less than the upper speed limit and the operating unit is operated toward the side for decreasing the upper speed limit, the upper speed limit setting means may use the second function. When the speed limit is equal to the upper speed limit, the upper speed limit setting means may use the first function.

Regarding the vehicle traveling control apparatus which sets the upper speed limit in this manner, in a situation in which a difference between the upper speed limit and the speed limit is lower than a certain value, when operating unit is operated toward the side for bringing the upper speed limit closer to the speed limit, it is considered that the operation is based on the intention of the driver to increase or decrease the upper speed limit. For this reason, if the operation in this situation is treated as the operation for setting the upper speed limit to the speed limit, the upper speed limit may be set in a manner different from the intention of the driver. Further, if the speed limit is set as the upper speed limit in this situation, since the difference between the upper speed limit and the speed limit is small, the change amount of the upper speed limit may be too small for the driver. This may cause a problem that the upper speed limit is set in a manner different from the expectation of the driver. For solving this problem, the present invention includes the speed deviation acquisition means and the prohibition means.

The speed deviation acquisition means acquires the speed deviation which is a magnitude of a deviation between the speed limit and the upper speed limit. When the speed deviation is equal to or less than the threshold which is higher than zero, the prohibition means prohibits the upper speed limit setting means from setting the upper speed limit through the second function. That is, in a situation in which the speed deviation is not only zero, but also equal to or less than the threshold which is higher than zero, the prohibition means prohibits the upper speed limit setting means from setting the upper speed limit using the second function. Therefore, in this situation, the upper speed limit setting means sets the upper speed limit through the first function. Therefore, it is possible to reduce a possibility of setting the upper speed limit in a manner different from the intention of the driver.

It should be noted that, when the speed limit is higher than the upper speed limit, the speed deviation may be a value obtained by subtracting the upper speed limit from the speed limit. When the speed limit is less than the upper speed limit, the speed deviation may be a value obtained by subtracting the speed limit from the upper speed limit. Alternatively, an absolute value of the difference between the speed limit and the upper speed limit may be used as the speed deviation.

In the above description, references used in the following descriptions regarding embodiments are added with parentheses to the elements of the present invention, in order to assist in understanding the present invention. However, those references should not be used to limit the scope of the invention.

BRIEF DESCRIPTION OF THE DRAWINGS

FIG. 10 is an explanatory drawing illustrating the switching of a display screen when the tap-up operation is performed continuously.

DETAILED DESCRIPTION OF THE EMBODIMENTS

Figure 1:
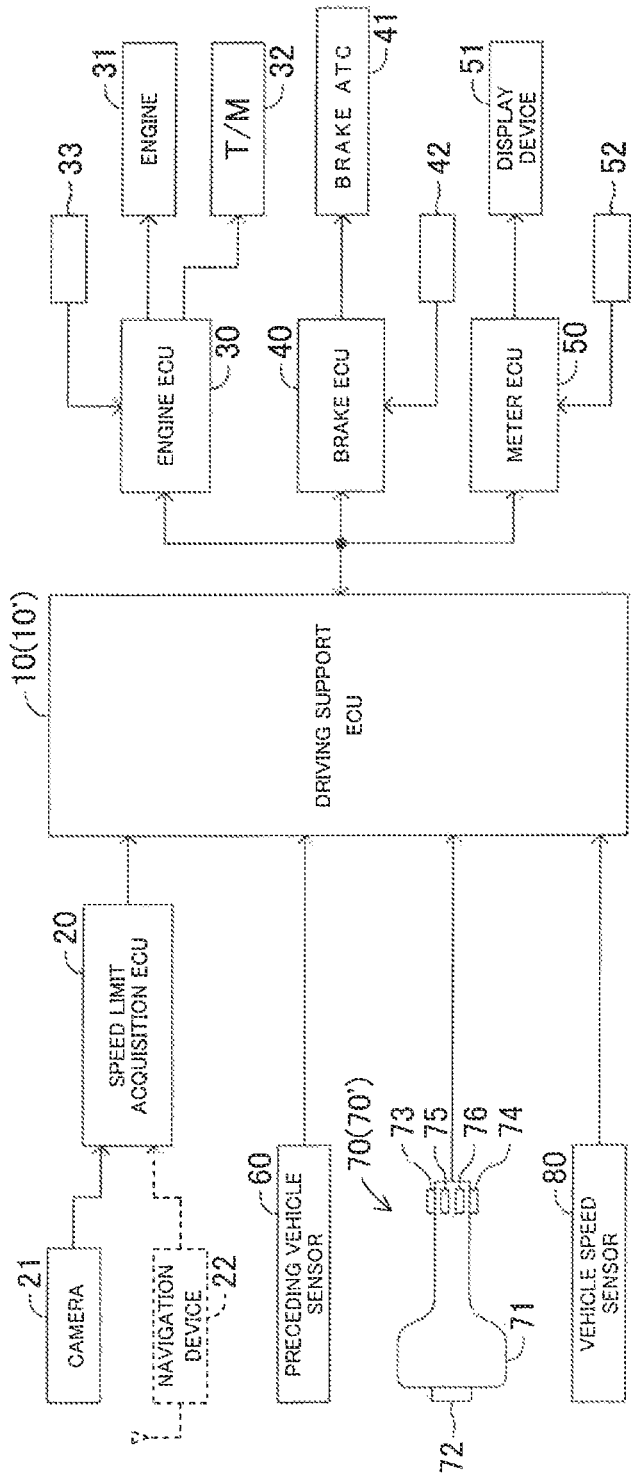
FIG. 1 is a schematic configuration diagram of a vehicle traveling control apparatus according to an embodiment of the present invention.

A vehicle traveling control apparatus according to embodiments of the present invention will next be described with reference to the drawings. FIG. 1 is a schematic configuration diagram of the vehicle traveling control apparatus according to the present embodiment.

The vehicle traveling control apparatus according to the present embodiment is a driving support/assist system for implementing RSA-ACC (Road Sign Assist-Adaptive Cruise Control). The RSA-ACC is a driving support/assist control in which a function for setting a target speed to a speed limit is additionally provided to a conventional cruise control having an inter-vehicle control function (hereinafter, referred to as "ACC"). The ACC is a driving support/assist control including (i) a constant speed control (CC: Cruise Control) which keeps an own vehicle traveling at a certain constant speed in accordance with (or equal to) a target speed (so called "set vehicle speed") set arbitrarily by a driver, and further including (ii) an inter-vehicle control to enable the own vehicle to follow a preceding vehicle so as to keep an inter-vehicle distance between the own vehicle and the preceding vehicle at a predetermined distance.

Therefore, when the RSA-ACC is implemented, it is possible to drive the own vehicle at a constant speed in accordance with (i.e., set to be equal to) the speed limit without requiring an accelerator pedal operation by the driver.

When the RSA-ACC is implemented, a speed limit of a road on which the own vehicle is traveling is acquired in real time. During the execution of the RSA-ACC, if the acquired speed limit differs from the current target speed, the driver is notified of that situation/fact. When the driver performs a specific operation for acceptance/permission (that is, when the driver performs an acceptance-response-operation) in response to the notification, the target speed is set to the speed limit (i.e., the target speed is made equal to the speed limit).

A configuration of the vehicle traveling control apparatus will be described below.

As illustrated in FIG. 1, the vehicle traveling control apparatus includes a driving support (assist) ECU 10, a speed limit acquisition ECU 20, an engine ECU 30, a brake ECU 40, and a meter ECU 50. Each of these ECUs is an electric control unit including a microcomputer as a main part. In addition, these ECUs are connected with each other so as to transmit and receive information via a CAN (Controller Area Network). In the present specification, the microcomputer includes a CPU, a ROM, a RAM, a non-volatile memory, an interface I/F, and the like. The CPU is configured to implement various functions by executing instructions (programs, routines) stored in the ROM. In the present embodiment, the driving support ECU 10 and the engine ECU 30 are provided separately, but the engine ECU 30 may include the functions of the driving support ECU 10.

The speed limit acquisition ECU 20 is the electric control unit which acquires a speed limit of a road on which the own vehicle is traveling currently, and is connected to an in-vehicle camera 21. The in-vehicle camera 21 takes an Image ahead of the vehicle, and transmits the obtained image information to the speed limit acquisition ECU 20. The speed limit acquisition ECU 20 has an image analysis function. The speed limit acquisition ECU 20 receives the image information output from the in-vehicle camera 21, recognizes a road sign (or a road mark) from the image information, and detects the speed limit (legal speed limit) indicated by the road sign. Accordingly, while the vehicle travels, the speed limit acquisition ECU 20 constantly receives the image information transmitted from the in-vehicle camera 21, analyzes the image information, and acquires (recognizes) the speed limit indicated by the road sign positioned ahead of the own vehicle.

In order to acquire the speed limit, a navigation apparatus 22 (illustrated by a broken line in FIG. 1) can be used in place of (or in addition to) the in-vehicle camera 21. The navigation apparatus 22 includes a GPS receiver for detecting a position of the own vehicle, a storage device for storing map information and road information, and a communication device for acquiring the latest map information and the latest road information from outside. The road information includes speed limit information. The navigation apparatus 22 may extract the speed limit information indicating the speed limit of the road on which the own vehicle is currently traveling based on a current position of the own vehicle on the map and the road information, and may output the extracted speed limit information to the speed limit acquisition ECU 20.

It should be noted that the navigation apparatus 22 may not be provided with the storage apparatus for storing the map information and the road information. For example, the navigation apparatus 22 may include a wireless communication terminal which receives the latest map information and the latest road information whenever necessary from an external information providing apparatus (infrastructure facility).

When the speed limit acquisition ECU 20 acquires the speed limit in this manner, the speed limit acquisition ECU 20 outputs/transmits the acquired speed limit to the driving support ECU 10.

The driving support ECU 10 is connected to a preceding vehicle sensor 60, a cruise operating unit/element 70, and a vehicle speed sensor 80.

The preceding vehicle sensor 60 has a function for acquiring information on the preceding vehicle (existing) ahead of the own vehicle, and, for example, includes a radar sensor and a camera. As the preceding vehicle sensor 60, other and various configurations may be used as long as the preceding vehicle can be detected and the distance between the own vehicle and the preceding vehicle can be detected. The preceding vehicle sensor 60 does not necessarily include both the radar sensor and the camera, but may include at least one of the radar sensor and the camera. Further, the preceding vehicle sensor 60 may include other sensors.

For example, the radar sensor irradiates a radio wave in the millimeter wave band in a forward direction, and in a case where a preceding vehicle exists, the radar sensor receives a reflected wave from the preceding vehicle. Then, based on the irradiation timing and the reception timing of the radio wave and the like, the radar sensor determines the presence or absence of a preceding vehicle, and calculates a distance between the own vehicle and the preceding vehicle (referred to as a "preceding vehicle inter-vehicle distance"), a relative speed between the own vehicle and the preceding vehicle (referred to as a "preceding vehicle relative speed"), and the like. The radar sensor outputs these calculation results to the driving support ECU 10. The camera is, for example, a stereo camera, and takes images of left and right landscapes ahead of the own vehicle. Based on the taken image data of the left and right sides, the camera determines the presence or absence of the preceding vehicle, and calculates the preceding vehicle inter-vehicle distance, the preceding vehicle relative speed, and the like. The camera outputs these calculation results to the driving support ECU 10. Hereinafter, information representing the presence or absence of the preceding vehicle, the preceding vehicle inter-vehicle distance, the preceding vehicle relative speed, and the like is referred to as "preceding vehicle information".

Figure 2:
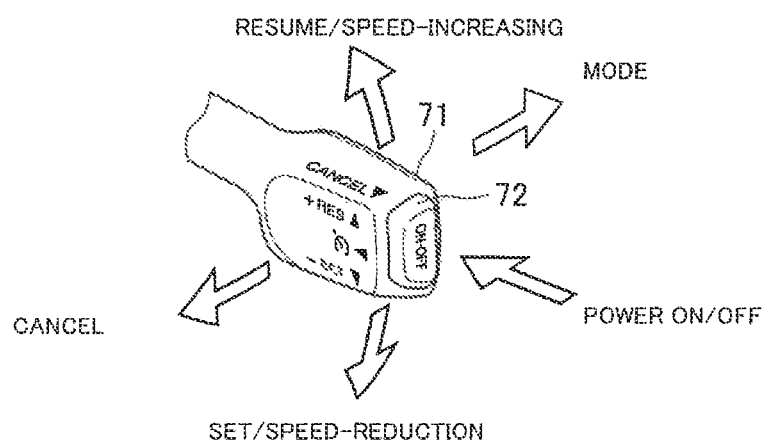
FIG. 2 is an explanatory drawing illustrating operation directions of a cruise operating unit.

The cruise operating unit 70 is provided with an operation lever 71. A base portion of the operation lever 71 is attached to a back side of a steering wheel, and an end portion of the operation lever 71 extends toward the outside in the radial direction of the steering wheel. As illustrated in FIG. 2, the end portion of the operation lever 71 is provided so as to swingably move upward, downward, frontward (rearward of the vehicle), and backward (forward of the vehicle) as seen from the driver.

The cruise operating unit 70 includes a main switch 72 provided at the end portion of the operation lever 71, a resume/speed-increasing switch 73, a set/speed-reduction switch 74, a cancel switch 75, and a mode switch 76. The resume/speed-increasing switch 73, the set/speed-reduction switch 74, the cancel switch 75, and the mode switch 76 can be turned ON by operation of the operation lever 71.

Hereinafter, the operation direction of the cruise operating unit 70 means a direction viewed from the driver sitting on a driver's seat.

In the cruise operating unit 70, except for the main switch 72, one of the switches which is being pushed in the operation direction turns ON only while the operation lever 71 is being operated by the driver. When the driver releases his/her hand from the operation lever 71, the operation lever 71 returns to an initial position so that each of the switches 73, 74, 75, and 76 turns OFF. In the present embodiment, as illustrated in FIG. 2, when the end portion of the operation lever 71 is pushed upward, the resume/speed-increasing switch 73 turns ON. When the end portion of the operation lever 71 is pushed downward, the set/speed-reduction switch 74 turns ON. When the end portion of the operation lever 71 is drawn to the near side (driver's side), the cancel switch 75 turns ON. When the end portion of the operation lever 71 is pushed backward (forward of the vehicle), the mode switch 76 turns ON. Furthermore, the main switch 72 is a main power switch whose ON/OFF state is alternately switched every time the push operation is performed.

The driving support ECU 10 is configured such that, only when the main switch 72 of the cruise operating unit 70 is in the ON state, the switch (the resume/speed-increasing switch 73, the set/speed-reduction switch 74, the cancel switch 75, or the mode switch 76) can function so as to be turned ON/OFF in response to the push operation of the operation lever 71.

When the main switch 72 is in the ON-state and the target speed has not been set yet, the driving support ECU 10 sets (stores), as the target speed, an actual vehicle speed (i.e., vehicle speed detected by the vehicle speed sensor 80) at the time point at which the set/speed-reduction switch 74 is turned OFF after the set/speed-reduction switch 74 is turned ON. In addition, when the set/speed-reduction switch 74 is turned ON in the case where the target speed has been set, the driving support ECU 10 decreases the target speed by a decrease width/amount corresponding to one lever-operation (push-operation) duration time.

For example, when the operation lever 71 is pushed downward momentarily (when the ON-duration time of the set/speed-reduction switch 74 is less than a predetermined time (for example, 0.6 seconds)), the driving support ECU 10 decreases the target speed by a predetermined speed (for example, 1 km/h) which is a small decrease width/amount. Hereinafter, this operation may be referred to as a "tap-down operation". Further, when the operation lever 71 has been pushed downward continuously for a predetermined time or more (when the ON-duration time of the set/speed-reduction switch 74 is equal to or longer than the predetermined time (for example, 0.6 seconds)), the driving support ECU 10 gradually (at a predetermined cycle) decreases the target speed by a predetermined speed interval (for example, 5 km/h) which is a large decrease width/amount while the operation lever 71 is being pushed for a predetermined time or more (while the set/speed-reduction switch 74 is in the ON-state) and after the operation lever 71 has been pushed for the predetermined time. As this operation gradually decelerates the own vehicle, this operation may be hereinafter referred to as a "coast operation".

When the resume/speed-increasing switch 73 is turned ON while the target speed has been set, the driving support ECU 10 increases the target speed by an increase width/amount corresponding to one-lever operation (push-operation) duration time. For example, when the operation lever 71 is momentarily pushed upward (when the ON-duration time of the resume/speed-increasing switch 73 is less than a predetermined time (for example, 0.6 seconds)), the driving support ECU 10 increases the target speed by a predetermined speed (for example, 1 km/h) which is a small increase width/amount for one lever operation. Hereinafter, this operation may be referred to as a "tap-up operation".

Further, when the operation lever 71 is pushed upward continuously for a predetermined time or more (when the ON-duration time of the resume/speed-increasing switch 73 is equal to or longer than a predetermined time (for example, 0.6 seconds)), the driving support ECU 10 gradually (at a predetermined cycle) increases the target speed by a predetermined speed interval (for example, 5 km/h) which is a large increase width/amount while the operation lever 71 is being pushed for the predetermined time or more (while the resume/speed-increasing switch 73 is in the ON-state) and after the operation lever 71 has been pushed for the predetermined time. As this operation gradually accelerates the own vehicle, this operation may be hereinafter referred to as an "acceleration operation".

Hereinafter, regarding the operation of the operation lever 71, the operation for continuously pushing the operation lever 71 for the predetermined time or longer is referred to as a "long-push operation", and the operation for momentarily pushing the operation lever 71 is referred to as a "short-push operation". The driving support ECU 10 measures the ON-duration time of the switch that Is turned ON by pushing the operation lever 71 (the ON-duration time being a time for which the pushed switch is continuously in the ON-state). When the ON-duration time is equal to or longer than the predetermined time (hereinafter referred to as a "long-push completion time"), the driving support ECU 10 regards this operation as the long-push operation. On the other hand, when the ON-duration time Is less than the long-push completion time, the driving support ECU 10 regards the operation as the short-push operation. Hereinafter, when it is unnecessary to distinguish between the long-push operation and the short-push operation, they are simply referred to as a "push operation" or an "operation". Furthermore, when the push operation is determined to be the long-push operation, an expression that "the long-push operation has been completed/confirmed" Is used.

The driving support ECU 10 regards/treats, as the coast operation, the long-push operation which is completed by pushing the operation lever 71 in a downward direction continuously for the long-push completion time or more. While the push operation continues for the long-push completion time or more (in a period from the time of the completion of the long-push operation until the push operation is not detected), the driving support ECU 10 decreases the target speed every time a certain period of time elapses. For example, the driving support ECU 10 gradually decreases the target speed at a predetermined speed interval (such as 100 km/h→95 km/h→90 km/h→ . . . ) every time the certain period of time elapses.

Similarly, the driving support ECU 10 regards/treats, as the acceleration operation, the long-push operation which is completed by pushing the operation lever 71 in an upward direction continuously for the long-push completion time or more. While the push operation continues for the long-push completion time or more (in a period from the time of the completion of the long-push operation until the push operation is not detected), the driving support ECU 10 increases the target speed every time a certain period of time elapses. For example, the driving support ECU 10 gradually increases the target speed at a predetermined speed interval (such as 80 km/h→85 km/h→90 km/h→ . . . ) every time the certain period of time elapses.

The target speed set by the coast operation and the acceleration operation is a multiple of 5 (5 in this embodiment, but not limited to this value). Therefore, when the target speed (i.e., initial target speed) at the time of starting of the increasing (or decreasing) adjustment is not a multiple of 5, a multiple of 5 which is closest to the initial target speed is set as the target speed. For example, when the coast operation is detected in a situation in which the target speed is 92 km/h, the driving support ECU 10 decreases the target speed in the following way (92 km/h→90 km/h→85 km/h→ . . . ). Similarly, when the acceleration operation is detected in a situation in which the target speed is 92 km/h, the driving support ECU 10 increases the target speed in the following way (92 km/h→95 km/h→100 km/h→ . . . ).

When the cancel switch 75 is turned ON or the main switch 72 is turned OFF while the traveling control (the inter-vehicle control or the constant speed control) is being performed, the driving support ECU 10 deactivates/terminates the traveling control. When the cancel switch 75 is turned ON, the driving support ECU 10 stores the target speed at that time. When the main switch 72 is turned OFF, the driving support ECU 10 erases the target speed (clear the memory value of the target speed) at that time.

When the resume/speed-increasing switch 73 is turned ON after deactivating the traveling control by turning ON the cancel switch 75, the driving support ECU 10 resumes the traveling control using the target speed which was stored when the cancel switch 75 was turned ON.

In the above manner, the driver uses the cruise operating unit 70 to increase or decrease the target speed (also called "set vehicle speed") for the constant speed control.

The mode switch 76 is a switch for switching a traveling control mode of the (own) vehicle between the inter-vehicle control mode and the constant speed control mode. Further, a switch (not shown in the figures) is provided that allows the driver to select whether or not to activate a function (called "RSA function") for setting the target speed to the speed limit. Therefore, the traveling control mode of the (own) vehicle includes (i) the RSA-ACC mode for executing the inter-vehicle control with the RSA function, (ii) an ACC mode for executing the inter-vehicle control (ACC) without activating the RSA function, (iii) a RSA-CC mode for executing the constant speed control (CC) with the RSA function, and (iv) a CC mode for executing the constant speed control (CC) without activating the RSA function. In addition, the traveling control mode of the vehicle may be switched using an operation time of the main switch 72, instead of the operation of the mode switch 76. For example, the traveling control mode may be set to the constant speed control mode through the long-push operation of the main switch 72, and the traveling control mode may be set to the inter-vehicle control mode through the short-push operation of the main switch 72.

When executing the inter-vehicle control (RSA-ACC and ACC), if the preceding vehicle is detected ahead of the own vehicle, the driving support ECU 10 has the own vehicle follow the preceding vehicle while maintaining the distance between the preceding vehicle and the own vehicle at an appropriate distance. If the preceding vehicle is not detected, the driving support ECU 10 keeps the own vehicle traveling at a constant speed corresponding to (or equal to) the target speed. Further, during the execution of the constant speed control (the RSA-CC mode and the CC mode), the driving support ECU 10 keeps the own vehicle traveling at a constant speed corresponding to (or equal to) the target speed.

Further, when the driving support ECU 10 keeps the own vehicle traveling at a constant speed under the execution of either the RSA-ACC mode or the RSA-CC mode, the driving support ECU 10 can set the target speed of the constant speed control to the speed limit which has been recognized by the speed limit acquisition ECU 20. Hereinafter, since there is no need to distinguish between the RSA-ACC and the RSA-CC, they are collectively referred to as a "RSA-ACC". Similarly, since the ACC and the CC do not need to be distinguished from each other, they are collectively referred to as an "ACC".

The cruise operating unit 70 is not only used for setting the ACC such as setting the target speed, but also used as an operating unit for accepting setting the target speed to the speed limit. When the cruise operating unit 70 is operated so as to allow the speed limit to be set as the target speed, the driving support ECU 10 sets the target speed to the speed limit which has been recognized by the speed limit acquisition ECU 20. Such a specific responsive operation (acceptance-response-operation, or permission-response-operation) for accepting setting the target speed to the speed limit will be described later.

The engine ECU 30 is connected to various sensors 33 that are necessary for controlling an engine 31 and controlling a transmission 32. The engine ECU 30 performs a fuel injection control, an ignition control, and an intake air amount control of the engine 31, based on a required driving force. Further, the engine ECU 30 performs a shift control of the transmission 32 based on a shift up line and a shift down line predetermined with respect to the vehicle speed and a throttle opening degree.

The driving support ECU 10 calculates a target acceleration of the own vehicle while it is executing either the constant speed control or the inter-vehicle control. For example, while the driving support ECU 10 is executing the constant speed control, it calculates the target acceleration of the own vehicle in such a manner that the vehicle speed of the own vehicle follows (comes closer to) the target speed, based on the vehicle speed detected by the vehicle speed sensor 80 and the target speed. Further, while the driving support ECU 10 is executing the inter-vehicle control, it calculates the target acceleration of the own vehicle in such a manner that a distance between the own vehicle and the preceding vehicle follows (comes closer to) a target inter-vehicle distance which is set according to the vehicle speed. Then, the driving support ECU 10 calculates a required driving force (including a negative value, that is, a required braking force) necessary to accelerate the own vehicle (or to decelerate the own vehicle when the target acceleration is a negative value) at the calculated target acceleration. The driving support ECU 10 transmits the required driving force to the engine ECU 30.

The engine ECU 30 controls the engine 31 and the transmission 32 according to the required driving force. When the required driving force has a value requiring a large braking force, and the engine 31 and the transmission 32 alone cannot satisfy the required driving force, the engine ECU 30 transmits a required braking force to the brake ECU 40 so as to compensate for the shortage in the braking force using the hydraulic brake.

The brake ECU 40 is connected to a brake actuator 41. The brake actuator 41 is provided in a hydraulic circuit (not shown) between a master cylinder that pressurizes brake oil by an operation of a brake pedal and a wheel cylinder that is built in a brake caliper of each wheel. The brake ECU 40 is connected to various sensors 42 necessary for controlling the brake actuator 41. The brake ECU 40 controls the brake actuator 41 based on the required braking force to generate a frictional braking force on the wheels.

The meter ECU 50 is connected to a display device 51 provided at a visible position from the driver's seat. When performing the RSA-ACC, the driving support ECU 10 transmits to the meter ECU 50 information on the current target speed, the preceding vehicle information including the presence or absence of the preceding vehicle, and information on the speed limit. The meter ECU 50 displays the current target speed on the display device 51 in accordance with the information transmitted from the driving support ECU 10. Further, when the preceding vehicle is detected in the inter-vehicle control mode, the meter ECU 50 displays a mark indicating the presence of the preceding vehicle on the display device 51. The screen thus displayed is called a normal display screen.

When the speed limit and the target speed are different from each other, the driving support ECU 10 transmits to the meter ECU 50 an inquiry display command for displaying an inquiry display screen on the display device 51. Upon receipt of the inquiry display command, the meter ECU 50 displays on the display device 51 the inquiry display screen displaying the speed limit, the target speed, and a mark indicating an operation direction for the specific responsive operation for acceptance (operation instruction for the acceptance-response-operation: operation direction of the operation lever 71 in the present embodiment).

Even when the speed limit and the target speed are different from each other, as described later, if an accept prohibition flag F is set at "1", the driving support ECU 10 does not transmit the inquiry display command. Therefore, in this case, the meter ECU 50 displays the normal display screen on the display device 51. Hereinafter, the present embodiment will be described under a situation in which the accept prohibition flag F is not set at "1".

Further, the meter ECU 50 is connected to an initial setting operation unit 52. The initial setting operation unit 52 is provided in an arbitrary position close to a seat of the driver. When the driver operates the initial setting operation unit 52, the meter ECU 50 displays an initial setting screen on the display device 51, and transmits to the driving support ECU 10 information on an initial setting value selected by the initial setting operation unit 52.

Although the RSA-ACC has the function for setting the target speed of the ACC to the speed limit of the road on which the own vehicle is traveling, it is not always preferable to set the target speed to the speed limit, depending on the standpoint of the driver or in view of various situations. Therefore, when the speed limit and the target speed are different from each other, the driving support ECU 10 inquires of the driver whether or not the driver wishes to set the target speed to the speed limit. For this inquiry, the inquiry display screen is displayed on the display device 51.

Figure 3:
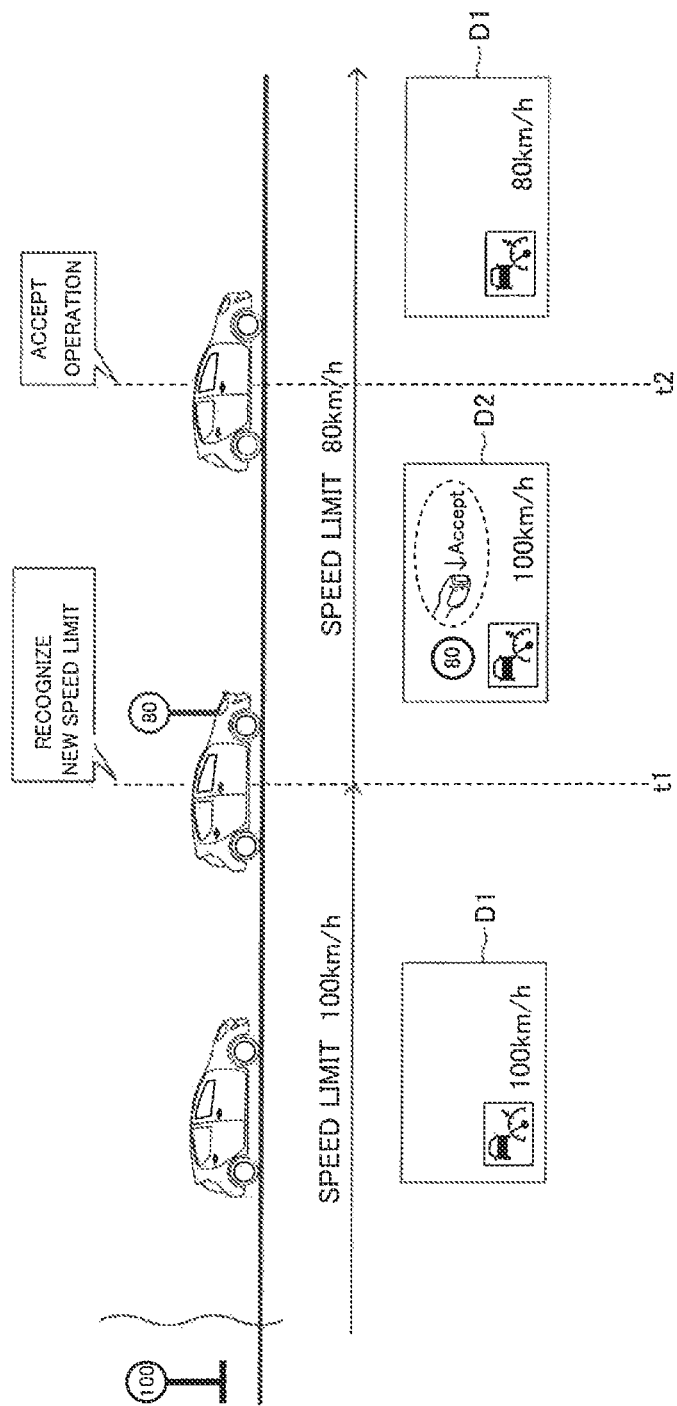
FIG. 3 is an explanatory drawing Illustrating a switching of a display screen with a change in a speed limit.

For example, as illustrated in FIG. 3, when the vehicle travels at a target speed of 100 km/h on a road with a speed limit of 100 km/h, a normal display screen D1 is displayed on the display device 51. With this normal display screen D1, the driver can recognize that the target speed is 100 km/h. At the time t1 at which the speed limit acquisition ECU 20 detects (acquires) a new speed limit (80 km/h) from a road sign, the speed limit acquisition ECU 20 transmits information on the new speed limit to the driving support ECU 10. The driving support ECU 10 transmits the new speed limit, the current target speed, and the inquiry display command to the meter ECU 50, to have the meter ECU 50 display the inquiry display screen D2 on the display device 51.

The inquiry display screen D2 includes the target speed at the present time, the speed limit at the present time, and the mark (refer to a portion surrounded by a broken line: hereinafter referred to as an "accept direction mark") Indicating the operation instruction (method) for the acceptance-response-operation. When the speed limit is higher than the target speed, the meter ECU 50 displays the accept direction mark indicating that the operation direction for the acceptance-response-operation to be conducted using the cruise operating unit 70 is upward. When the speed limit is lower than the target speed, the meter ECU 50 displays the accept direction mark indicating that operation direction for the acceptance-response-operation to be conducted using the cruise operating unit 70 is downward. In the example of FIG. 3, since the target speed at that time is 100 km/h whereas the speed limit is 80 km/h, the accept direction mark indicates that the (push) operation direction of the cruise operating unit 70 (operation direction for the acceptance-response-operation) is downward.

While the inquiry display screen D2 is displayed on the display device 51 (that is, while the speed limit is different from the target speed), if the long-push operation of the cruise operating unit 70 is performed in the direction indicated by the accept direction mark, the driving support ECU 10 sets the target speed to the speed limit. Therefore, by performing the long-push operation of the operation lever 71 in the operation direction for the acceptance-response-operation, the driver can keep the own vehicle traveling at a constant speed in accordance with the speed limit (i.e., at a constant speed equal to the speed limit).

For example, if it is detected that the upward long-push operation of the cruise operating unit 70 is performed while the speed limit is higher than the target speed, the driving support ECU 10 sets the target speed to the speed limit (whereas, if the direction of the long-push operation of the cruise operating unit 70 is the downward direction, the driving support ECU 10 does not set the target speed to the speed limit). On the other hand, if it is detected that the downward long-push operation of the cruise operating unit 70 is performed while the speed limit is lower than the target speed, the driving support ECU 10 sets the target speed to the speed limit (whereas, if the direction of the long-push operation of the cruise operating unit 70 is the upward direction, the driving support ECU 10 does not set the target speed to the speed limit).

In a case where the speed limit Is higher than the target speed, the operation direction for the acceptance-response-operation for permitting the speed limit to be set as the target speed is set in the same direction as the operation direction for increasing the target speed using the cruise operating unit 70. On the other hand, in a case where the speed limit is lower than the target speed, the operation direction for the acceptance-response-operation is set in the same direction as the operation direction for decreasing the target speed using the cruise operating unit 70. In this manner, the operation direction for the acceptance-response-operation is set in the same direction as the operation direction of the cruise operating unit 70 for bringing the target speed closer to the speed limit.

Further, in order to determine whether or not the specific responsive operation (acceptance-response-operation) has been performed according to the driver's intention, for the acceptance-response-operation to accept to set the target speed to the speed limit, the long-push operation of the cruise operating unit 70 is required. Therefore, even when the cruise operating unit 70 is pushed in the direction of the acceptance-response-operation while the inquiry display screen D2 is being displayed, the driving support ECU 10 does not accept the push operation as the acceptance-response-operation unless the push operation is the long-push operation.

In this manner, the function of the long-push operation of the cruise operating unit 70 is switched between at the time of displaying the normal display screen D1 and at the time of displaying the inquiry display screen D2. That is, when the normal display screen D1 is being displayed, the long-push operation (in upward direction or downward direction) of the cruise operating unit 70 functions as the acceleration operation or the coast operation. On the other hand, when the inquiry display screen D2 is being displayed, if the direction of the long-push operation of the cruise operating unit 70 is the operation direction for the acceptance-response-operation, the long-push operation functions as the acceptance-response-operation for permitting the speed limit to be set as the target speed. Further, when the inquiry display screen D2 is being displayed, if the direction of the long-push operation of the cruise operating unit 70 is not the operation direction for the acceptance-response-operation, the long-push operation functions as the acceleration operation or the coast operation.

For example, as illustrated in FIG. 3, when the long-push operation of the cruise operating unit 70 in the direction of the acceptance-response-operation is detected at the time t2, the target speed is set to the speed limit and the inquiry display screen D2 is switched to the normal display screen D1. In this example, the target speed is switched from 100 km/h to 80 km/h.

Hereinafter, the permission/acceptance response for permitting the speed limit to be set as the target speed is called "accept", and the acceptance-response-operation is called "accept operation". Further, the operation direction for the acceptance-response-operation (the operation direction for bringing the target speed closer to the speed limit) is called "accept direction".

As described above, when the long-push operation of the operation lever 71 is detected during the execution of the ACC (including the CC as described above), the driving support ECU 10 regards/treats the operation as the acceleration operation or the coast operation, and increases or decreases the target speed. However, in a situation in which the inquiry display screen D2 is displayed, only when the operation lever 71 is operated for the long-push operation in the operation direction for the acceptance-response-operation, the driving support ECU 10 sets the target speed to the speed limit. Therefore, the cruise operating unit 70 serves as both a target speed setting operating unit for increasing or decreasing the target speed for the constant speed control, and as a permission operating unit for permitting the speed limit to be set as the target speed.

Meanwhile, it is desirable to set the target speed by using the cruise operating unit 70 as easily as possible in a short time. On the other hand, it is necessary for the driver to operate the cruise operating unit 70 which is commonly used for setting the target speed to the speed limit and for setting the target speed to an arbitrary value desired by the driver.

Even when the speed limit and the target speed are slightly different from each other, if the inquiry display screen is always displayed on the display device 51, the driver can perform the "accept" by one long-push operation of the cruise operating unit 70 (the operation lever 71) at any time. Therefore, for the driver who wishes to keep the own vehicle traveling at a constant speed in accordance with the speed limit, such a configuration may provide good operability. However, for the driver who tries to freely increase or decrease the target speed, if the long-push operation in the accept direction is always treated as the accept operation when the speed limit and the target speed are different from each other, good operability may not be obtained.

Figure 4A:
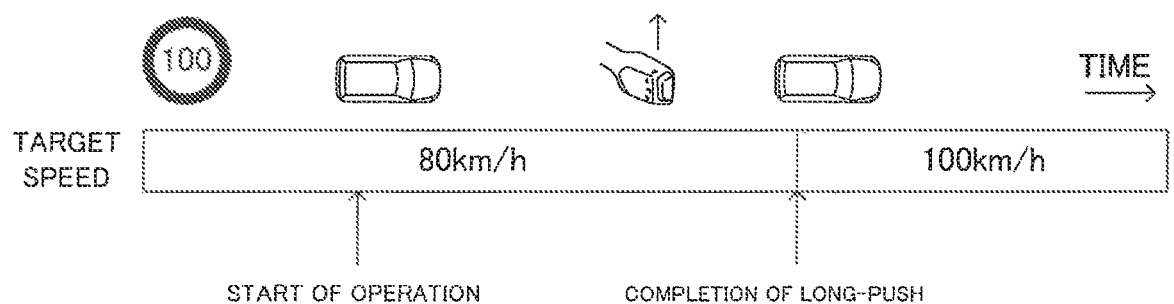
FIG. 4A is a diagram illustrating a function of the cruise operating unit when a long push operation of the cruise operating unit in an accept direction is performed.

For example, "Example 1" in FIG. 4A illustrates a situation in which the current target speed is 80 km/h and the speed limit is 100 km/h. In this situation, when the long-push operation of the cruise operating unit 70 is treated as the accept operation, one long-push operation increases the target speed by 20 km/h (=(100−80) km/h). That is, in this case, when the push operation of the cruise operating unit 70 continues for the long-push completion time, a large increased amount (20 km/h) of the target speed can be obtained.

Figure 4B:
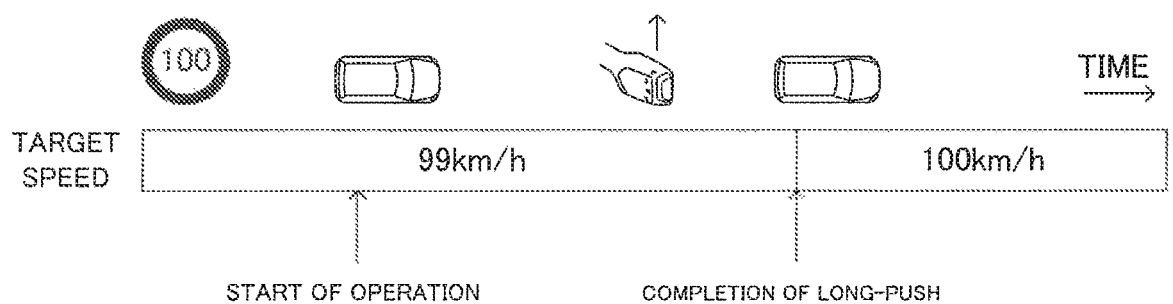
FIG. 4B is a diagram illustrating a function of the cruise operating unit when the long push operation of the cruise operating unit in the accept direction is performed.

On the other hand, "Example 2" in FIG. 4B illustrates a situation in which the current target speed is 99 km/h and the speed limit is 100 km/h. In this situation, when the long-push operation of the cruise operating unit 70 is treated as the accept operation, one long-push operation increases the target speed by only 1 km/h (=(100−99) km/h). Therefore, even if the cruise operating unit 70 is pushed in a long time, it is not possible to increase the target speed by a large increased amount. In this situation, in order to perform the acceleration operation by using the cruise operating unit 70, it is necessary to stop the long-push operation of the cruise operating unit 70 once (that is, the driver releases the hand from the cruise operating unit 70), and then start the long-push operation again. Therefore, in this Example 2, when the driver tries to increase the target speed by a large increased amount, the number of times of the operation of the cruises operating unit 70 increases, and thus, the operation time increases (that is, since it is necessary to complete the first long-push operation and then, complete the second long-push operation, an additional time for the second long-push operation is required).

As described above, in a situation in which the current target speed is close to the speed limit, if the long-push operation of the cruise operating unit 70 in the accept direction is treated as the accept operation, good usability/operability may not be provided to the driver who intends to increase or decrease the target speed freely. Further, it is likely that the target speed is set in a manner different from the intention of the driver.

Therefore, in the present embodiment, when the current target speed is close to the speed limit, the driving support ECU 10 regards/treats the long-push operation of the cruise operating unit 70 in the accept direction not as the accept operation, but as the acceleration operation (in case of the upward long-push operation) or as the coast operation (in case of the downward long-push operation). Here, the target speed at the present time is referred to as a target speed Vset, the speed limit recognized by the speed limit acquisition ECU 20 at the present time is referred to as a speed limit Vlim. Further, a magnitude of a deviation between the target speed Vset and the speed limit Vlim is referred to as a "speed deviation".

When the speed deviation is lower than a certain value, usability of the cruise operating unit 70 can be improved by treating/regarding the long-push operation of the cruise operating unit 70 in the accept direction as the acceleration operation. In contrast, when the speed deviation is higher than the certain value, if the long-push operation of the cruise operating unit 70 in the accept direction is treated/regarded as the acceleration operation (or the coast operation), the timing at which the target speed reaches the speed limit is excessively delayed.

Figure 5:
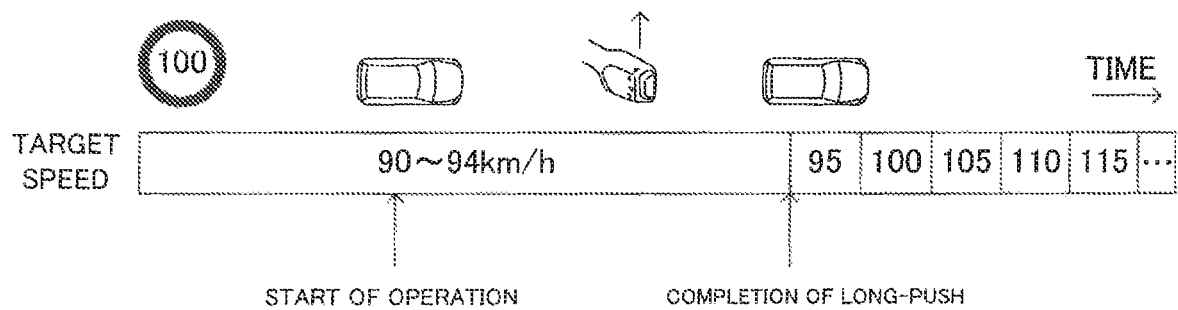
FIG. 5 is a diagram illustrating a function of a cruise operating unit when the long push operation of the cruise operating unit in the accept direction is performed.

For example, a case is considered where the unit change amount when changing the target speed through one acceleration operation (or one coast operation) as described above is 5 km/h, and the long-push operation of the cruise operating unit 70 in the accept direction is treated as the acceleration operation when the speed deviation is lower than 10 km/h. In this case, as illustrated in FIG. 5, when the speed limit is 100 km/h and the target speed Vset is 90-94 km/h, the target speed becomes 95 km/h at the time of the completion of the long-push operation of the cruise operating unit 70. Thereafter, the target speed is increased by 5 km/h every time a certain period of time passes. Therefore, in order to set the target speed to the speed limit, the driver has to continue the push operation of the cruise operating unit 70 until the target speed is changed from 95 km/h to 100 km/h. For this reason, the timing at which the target speed reaches the speed limit is delayed, and therefore, the push operation for a long time is required for the driver who intends to keep the own vehicle traveling at a constant speed equal to the speed limit.

Therefore, in the present embodiment, the driving support ECU 10 sets, as a threshold, a unit change amount (5 km/h) when changing the target speed sequentially with the lapse of time by the long-push operation of the cruise operating unit 70. When the speed deviation is equal to or lower than the threshold, the driving support ECU 10 regards/treats the long-push operation of the cruise operating unit 70 in the accept direction as the acceleration operation (or the coast operation). Further, when the speed deviation is higher than the threshold, the driving support ECU 10 regards/treats the long-push operation of the cruise operating unit 70 in the accept direction as the accept operation.

Figure 6:
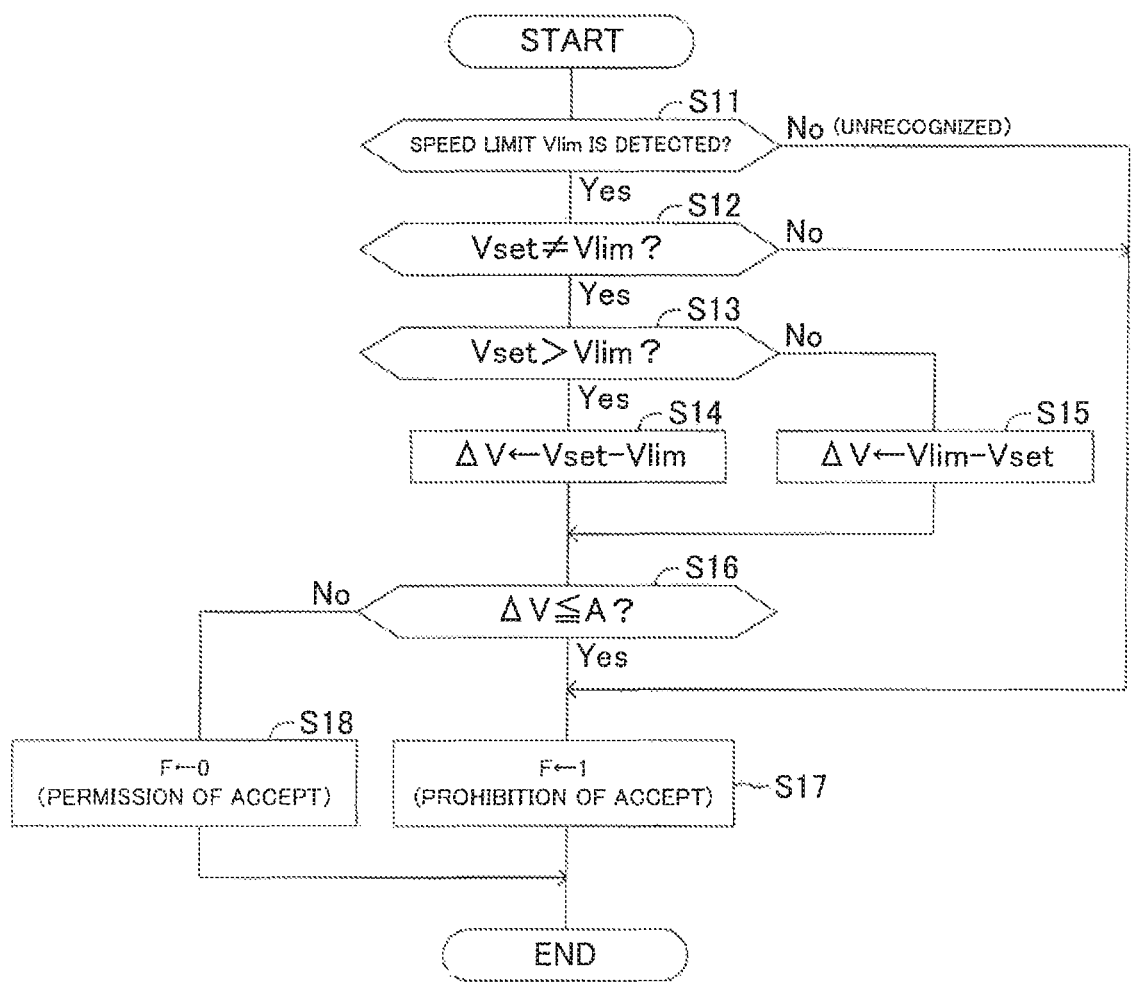
FIG. 6 is a flowchart illustrating an accept prohibition flag setting routine.

FIG. 6 illustrates a routine for setting an accept prohibition flag (hereinafter referred to as an "accept prohibition flag setting routine"). This routine is one of routines for switching the function of the long-push operation of the cruise operating unit 70 as described above. When the mode for implementing the RSA-ACC (including the RSA-CC as described above) is selected, the driving support ECU 10 repeats the accept prohibition flag setting routine every time a predetermined calculation cycle elapses.

When the accept prohibition flag setting routine is started, at step S11, the driving support ECU 10 determines whether or not the speed limit Vlim is detected, that is, whether or not the speed limit acquisition ECU 20 recognizes the speed limit Vlim of the road on which the own vehicle is traveling. When the speed limit Vlim is detected by the speed limit acquisition ECU 20, at step S12, the driving support ECU 10 determines whether or not the target speed Vset and the speed limit Vlim are different from each other. When the target speed Vset and the speed limit Vlim are different from each other, at step S13, the driving support ECU 10 determines whether or not the target speed Vset is higher than the speed limit Vlim. When the target speed Vset is higher than the speed limit Vlim, at step S14, the driving support ECU 10 sets, as the speed deviation ΔV, a value obtained by subtracting the speed limit Vlim from the target speed Vset. On the other hand, when the target speed Vset is lower than the speed limit Vlim, in step 15, the driving support ECU 10 sets, as the speed deviation ΔV, a value obtained by subtracting the target speed Vset from the speed limit Vlim.

Next, at step S16, the driving support ECU 10 determines whether or not the speed deviation ΔV is equal to or lower than a threshold A. This threshold A is higher than zero, and is the same value as the unit change amount (5 km/h in the present embodiment) when sequentially changing the target speed with the lapse of time by (owing to) the long-push operation of the cruise operating unit 70.

When the speed deviation ΔV is equal to or lower than the threshold A, at step S17, the driving support ECU 10 sets the accept prohibition flag F to "1". On the other hand, when the speed deviation ΔV is higher than the threshold A, at step S18, the driving support ECU 10 sets the accept prohibition flag F to "0".

Further, when it is determined that the speed limit Vlim has not been detected at step S11, the driving support ECU 10 advances the process to step S17, and sets the accept prohibition flag F to "1". In addition, when the target speed Vset is equal to the speed limit Vlim at step S12, the driving support ECU 10 advances the process to step S17, and sets the accept prohibition flag F to "1".

Regarding the accept prohibition flag F, the value "1" indicates a situation for prohibiting the long-push operation of the cruise operating unit 70 from being treated as the accept operation. Further, the value "0" Indicates a situation for permitting the long-push operation of the cruise operating unit 70 in the accept direction to be treated as the accept operation.

Once the driving support ECU 10 sets the accept prohibition flag F at step S17 or S18, the driving support ECU 10 tentatively ends the present routine. The driving support ECU 10 repeats the present routine every time the predetermined calculation cycle elapses.

Figure 7:
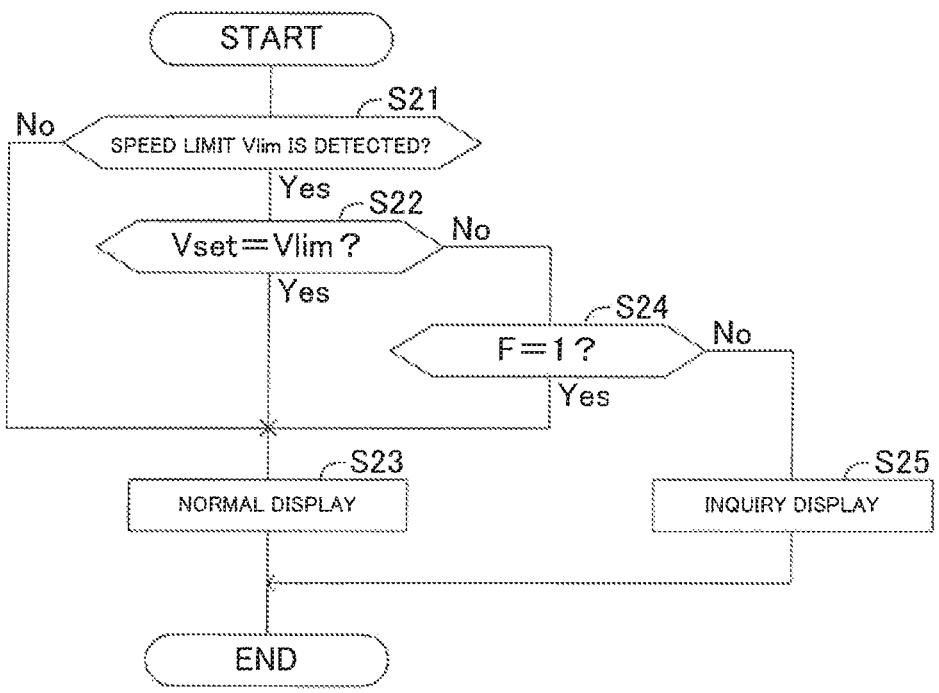
FIG. 7 is a flowchart illustrating a display switching control routine.

The driving support ECU 10 executes a display switching control routine (FIG. 7) and a target speed setting routine (FIG. 8) based on the accept prohibition flag F.

The driving support ECU 10 repeats the display switching control routine every time the predetermined calculation cycle elapses, in parallel with the accept prohibition flag setting routine. When the display switching control routine (FIG. 7) is started, at step S21, the driving support ECU 10 determines whether or not the speed limit Vlim is detected. When the speed limit is detected, at step S22, the driving support ECU 10 determines whether or not the current target speed Vset and the current speed limit Vlim are the same as each other.

When the target speed Vset and the speed limit Vlim are the same as each other (S22:Yes), at step S23, the driving support ECU 10 transmits information on the target speed Vset and a normal display command to the meter ECU 50. Therefore, the meter ECU 50 displays the normal display screen D1 including the target speed Vset on the display device 51.

On the other hand, when the target speed Vset and the current speed limit Vlim are different from each other (S22:No), at step S24, the driving support ECU 10 determines whether or not the accept prohibition flag F is "1". When the accept prohibition flag F is not "1" (S24:No), at step 25, the driving support ECU 10 transmits to the meter ECU 50 information on the target speed Vset and the speed limit Vlim, and the inquiry display command. Therefore, the meter ECU 50 displays the inquiry display screen D2 including the target speed Vset, the speed limit Vlim, and the accept direction mark on the display device 51. In this manner, the inquiry (suggestion) for setting the target speed to the speed limit is made to the driver, and the driver is notified of the accept direction.

On the other hand, when the accept prohibition flag F is "1" (S24:Yes), the driving support ECU 10 advances the process to step S23. Therefore, the normal display screen D1 is displayed on the display device 51. That is, even when the target speed Vset and the current speed limit Vlim are not the same as each other, if the speed deviation ΔV is equal to or lower than the threshold A (>0), the driving support ECU 10 displays the normal display screen D1 on the display device 51. Therefore, the inquiry (suggestion) for setting the target speed to the speed limit is not made to the driver, and the driver is not notified of the operation direction for the acceptance-response-operation.

Once the driving support ECU 10 executes the display process at step S23 or S25, the driving support ECU 10 tentatively ends the present routine. The driving support ECU 10 repeats the display switching control routine every time the predetermined calculation cycle elapses.

Figure 8:
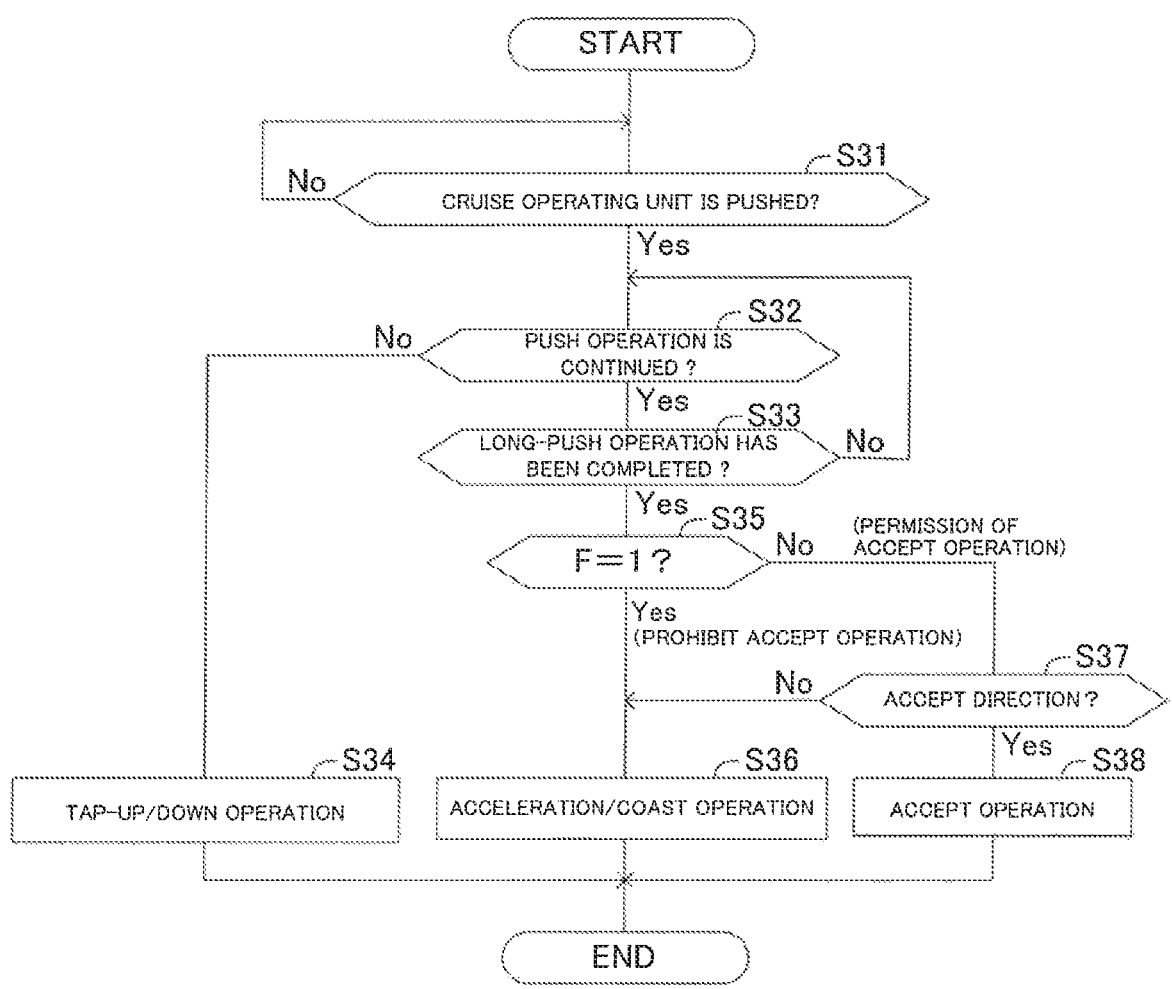
FIG. 8 is a flowchart illustrating a target speed setting routine.

The driving support ECU 10 executes the target speed setting routine shown in FIG. 8 every time the predetermined calculation cycle elapses, in parallel with the accept prohibition flag setting routine and the display switching control routine. When the target speed setting routine is started, at step S31, the driving support ECU 10 determines whether or not the cruise operating unit 70 is pushed. Here, the driving support ECU 10 determines whether or not any one of the upward operation (ON of the resume/speed-increasing switch 73) and the downward operation (ON of the set/speed-reduction switch 74) of the cruise operating unit 70 is performed. The upward operation and the downward operation relate to setting the target speed.

The driving support ECU 10 repeats the determination process at step S31 every time the predetermined calculation cycle elapses, and waits until the push operation of the cruise operating unit 70 is detected. When the push operation of the cruise operating unit 70 is detected (S31:Yes), at step S32, the driving support ECU 10 determines whether or not the push operation is being continued. When the push operation is being continued, at step S33, the driving support ECU 10 determines whether or not the push operation has been completed/confirmed as the long-push operation. In other words, the driving support ECU 10 measures the duration time (the ON-duration time of the resume/speed-increasing switch 73 or the set/speed-reduction switch 74) while the cruise operating unit 70 is being pushed. Thereafter, the driving support ECU 10 determines whether or not the ON-duration time is equal to or longer than the predetermined long-push completion time.

When the push operation of the cruise operating unit 70 has not been completed/confirmed as the long-push operation (S33:No), the driving support ECU 10 returns the process to step S32 and repeats the above-described process every time the predetermined calculation cycle elapses. If the push operation of the cruise operating unit 70 is terminated before the long-push operation has been completed/confirmed (S32: No), that is, if the operation of the cruise operating unit 70 is the short-push operation, at step S34, the driving support ECU 10 regards/treats the operation as the tap-up operation or the tap-down operation. When the operation direction of the cruise operating unit 70 is the upward direction, the driving support ECU 10 regards/treats the operation as the tap-up operation, and increases the target speed by a predetermined speed width (for example, 1 km/h). On the other hand, when the operation direction of the cruise operating unit 70 is the downward direction, the driving support ECU 10 regards/treats the operation as the tap-down operation, and decreases the target speed by a predetermined speed width (for example, 1 km/h).

On the other hand, if the duration of time during which the push operation of the cruise operating unit 70 is continued is equal to or longer than the long-push completion time at step S33, that is, when the push operation of the cruise operating unit 70 has been completed/confirmed as the long-push operation, the driving support ECU 10 advances the process to step S35. At step S35, the driving support ECU 10 reads the accept prohibition flag F. When the accept prohibition flag F is "1" (S35:Yes), at step S36, the driving support ECU 10 regards/treats the push operation (long-push operation) of the cruise operating unit 70 as the acceleration operation or the coast operation. Therefore, the driving support ECU 10 sequentially increases or decreases the target speed from the current value to a value equal to a multiple of a predetermined value (5 km/h in this example).

In this case, when the operation direction of the cruise operating unit 70 is the upward direction, the driving support ECU 10 regards/treats the operation as the acceleration operation. In a period from a time point at which the long-push operation has been completed/confirmed until a time point at which the push operation of the cruise operating unit 70 does not become detected (i.e., while the push operation of the cruise operating unit 70 is being continued), the driving support ECU 10 increases the target speed (by the unit change amount equal to the threshold A) every time the certain period of time elapses. Further, when the operation direction of the cruise operating unit 70 is the downward direction, the driving support ECU 10 regards/treats the operation as the coast operation. In a period from a time point at which the long-push operation has been completed/confirmed until a time point at which the push operation of the cruise operating unit 70 does not become detected (i.e., while the push operation of the cruise operating unit 70 is being continued), the driving support ECU 10 decreases the target speed (by the unit change amount equal to the threshold A) every time the certain period of time elapses.

When the accept prohibition flag F is "0" (S35:No), at step S37, the driving support ECU 10 determines whether or not the operation direction of the cruise operating unit 70 is the accept direction. As described above, the accept direction is the direction indicated by the accept direction mark displayed on the inquiry display screen D2. The accept direction is upward in the case where the speed limit is higher than the target speed. Further, the accept direction is downward in the case where the speed limit is lower than the target speed. That is, the accept direction is the same direction as the operation direction for bringing the target speed closer to the speed limit by using the cruise operating unit 70.

When the operation direction of the cruise operating unit 70 is the accept direction, at step S38, the driving support ECU 10 regards/treats the operation as the accept operation, and sets the target speed to the speed limit Vlim recognized by the speed limit acquisition ECU 20.

When the operation direction of the cruise operating unit 70 is not the accept direction, the driving support ECU 10 advances the process to step S36. Then, the driving support ECU 10 regards/treats the operation as the acceleration operation or the coast operation, and sequentially increases or decreases the target speed from the current value.

Regarding the process in each of steps S36 and S38, the driving support ECU 10 continues to perform the setting process of the target speed in accordance with the long-push operation until the push operation of the cruise operating unit 70 is terminated. When the process at step S34, S36 or S38 has been completed/confirmed, the driving support ECU 10 tentatively ends the present routine. The driving support ECU 10 repeats the present routine every time the predetermined calculation cycle elapses.

According to the vehicle traveling control apparatus in the present embodiment described above, even when the current target speed and the current speed limit are different from each other, in a case where the speed deviation $\Delta V$ is equal to or lower than the threshold A (>0), the vehicle traveling control apparatus regards/treats the long-push operation of the cruise operating unit 70 in the accept direction not as the accept operation, but as the acceleration operation or the coast operation. Further, the threshold A is the same as the unit change amount (5 km/h) when sequentially changing the target speed with the lapse of time by (owing to) the long-push operation of the cruise operating unit 70.

Figure 9A:
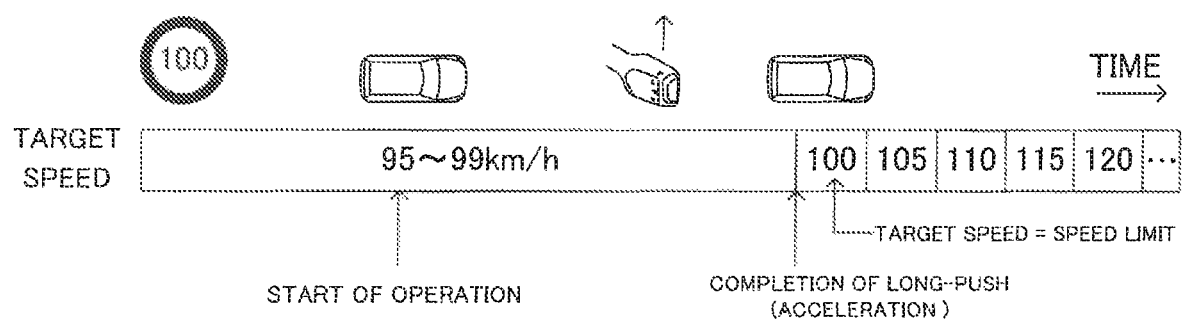
FIG. 9A is a diagram illustrating a function of the cruise operating unit according to the present embodiment when the long push operation of the cruise operating unit in the accept direction is performed.

For example, as Illustrated in FIG. 9A, it is assumed that the current speed limit Vlim is 100 km/h and the current target speed Vset is in the range of 95-99 km/h. In this case, when the long-push operation of the cruise operating unit 70 has been completed/confirmed, the target speed becomes 100 km/h, which is the same as the speed limit. Thereafter, while the push operation of the cruise operating unit 70 is being continued, the target speed is increased by 5 km/h every time the certain period of time elapses. Therefore, when the driver wants to increase or decrease the target speed freely, the driver can change the target speed to a value which the driver desires by continuing one push operation of the cruise operating unit 70. Further, when the driver wants to set the target speed to the speed limit, the driver can set the target speed to the speed limit by performing one long-push operation and then terminating the push operation at the completion of the long-push operation.

Further, in a situation where the speed deviation ΔV is higher than the threshold A, the driver can set the target speed to the speed limit through (with only) one-time long-push operation of the cruise operating unit.

Figure 9B:
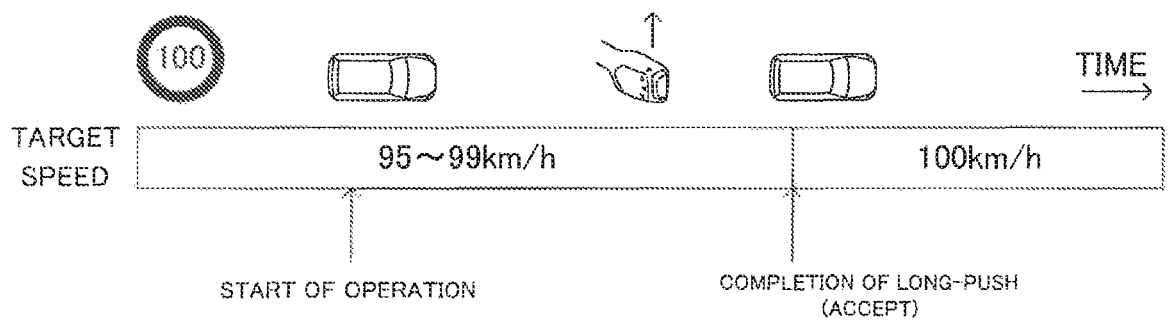
FIG. 9B is a diagram illustrating a function of the cruise operating unit according to a comparative example when the long push operation of the cruise operating unit in the accept direction is performed.

FIG. 9B illustrates a comparative example in which the accept operation is not prohibited in the case where the speed deviation ΔV is equal to or lower than the threshold A. As can be seen from this figure, the long-push operation of the cruise operating unit 70 cannot change the target speed to a value higher than the speed limit. When the driver wants to increase the target speed to a value higher than the speed limit, an additional push operation is required.

Therefore, according to the present embodiment, the driver can set a desired target speed by a simple operation (the small number of operations) and in a short time. Accordingly, it is possible improve usability of the cruise operating unit 70 which serves as both the operating unit for increasing or decreasing the target speed for the constant speed control, and the operating unit for permitting the speed limit to be set as the target speed.

Further, in the case where the speed deviation ΔV is lower than the predetermined value (threshold A), the long-push operation in the accept direction is mostly performed based on the driver's intention to increase or decrease the target speed, but is rarely performed based on the driver's intention to set the target speed to the speed limit. When the difference between the current target speed and the current speed limit is smaller than the predetermined value, if the speed limit is set as the target speed, the increase amount of the target speed is very small. Therefore, when the speed deviation ΔV is equal to or smaller than the threshold A, the driving support ECU 10 regards/treats the long-push operation in the accept direction not as the accept operation, but as the acceleration operation or the coast operation. Therefore, it is possible to set the target speed in accordance with the intention of the driver.

Further, when the speed deviation ΔV is equal to or smaller than the threshold A, the normal display screen D1 is displayed as substitute for (in place of) the inquiry display screen D2. Therefore, the displayed screen matches up with (corresponds to) the function (the acceleration operation or the coast operation) of the long-push operation of the cruise operating unit 70. That is, when the function of the long-push operation of the cruise operating unit 70 is the acceleration operation or the coast operation, the inquiry display screen D2 is not displayed so as not to provide/present the guidance of the acceptance-response-operation to the driver. Therefore, it is possible to prevent the driver from feeling discomfort.

Further, in a period in which the speed deviation ΔV is equal to or smaller than the threshold A, the normal display screen D1 is continuously displayed. Therefore, it is possible to prevent the display screen from being switched repeatedly within a short period. Here, a configuration is considered in which the normal display screen D1 is displayed on the display device 51 only when the speed limit and the target speed are the same as each other (including a case where the speed limit has not been recognized). In this configuration, for example, as illustrated in a comparative example of FIG. 10, in a case where the target speed is increased by repeating the tap-up operation, the display screen may be repeatedly switched in a short period (D1→D2→D1→D2). For this reason, it is likely that the driver feels discomfort. This also applies to the case where the tap-down operation is repeated.

To cope with the above problem, as illustrated in (b) of FIG. 10, the vehicle traveling control apparatus according to the present embodiment continuously displays the normal display screen D1 as substitute for (in place of) the inquiry display screen D2 in the period during which the speed deviation ΔV is equal to or smaller than the threshold A (5 km/h in this example) (including the case where the speed limit and the target speed are the same as each other). As a result, the display screen is not repeatedly switched over within a short period, and it is possible to prevent the driver from feeling discomfort.

<Modification 1>

In the above-described embodiment, the threshold A is the same as the unit change amount (5 km/h) when changing the target speed sequentially with the lapse of time by the long-push operation of the cruise operating unit 70. In this configuration, when the speed deviation ΔV is equal to or smaller than the threshold A, if the driver continuously pushes the cruise operating unit 70 in the accept direction, the target speed becomes higher than the speed limit or becomes lower than the speed limit. Therefore, it is necessary for the driver who wants to set the target speed to the speed limit to continuously watch the display device 51, and terminate the long-push operation of the cruise operating unit 70 at a time point at which the target speed becomes equal to the speed limit.

In view of the above, the modification 1 is configured in such a manner that the threshold A can be changed freely by the driver. For example, when a specific operation (initial setting operation) is performed using the initial setting operation unit 52, the meter ECU 50 displays a selection screen for selecting the threshold A on the display device 51. On this selection screen, values that can be selected as the threshold A are displayed. For example, the values for threshold A include a predetermined plurality of values (e.g., 0, 5, 10, 15, 20) including zero. The driver operates the initial setting operation unit 52 to select a desired value as the threshold A from the plurality of values. The meter ECU 50 transmits information on the selected value as the threshold A to the driving support ECU 10. Upon of receipt of the information on the selected value as the threshold A, the driving support ECU 10 updates the threshold A used at step S16 in the accept prohibition flag setting routine according to the selected value as the received threshold A.

According to the modification 1, it is possible to set a range for increasing/decreasing the target speed in accordance with the preference of the driver. For example, in the case where the threshold A is zero, when the speed limit and the target speed are different from each other, it is possible to certainly set the target speed to the speed limit by performing the long-push operation of the cruise operating unit 70 in the accept direction, regardless of the push (duration) time after the long-push operation has been completed/confirmed. That is, the driver can set the target speed to the speed limit without worrying about the timing to terminate the long-push operation (without watching the display device 51). Therefore, for the driver who always wants to set the target speed to the speed limit, good usability can be maintained.

<Modification 2>

In the above-described embodiment, when the cancel switch 75 is turned ON, the driving support ECU 10 stores the target speed at that time. Thereafter, when the resume/speed-increasing switch 73 is turned ON, the driving support ECU 10 restarts/resumes the traveling control using the target speed (referred to as a "stored speed") which was stored at the time when the cancel switch was turned ON. In this modification 2, when the resume/speed-increasing switch 73 is turned ON and this operation of the cruise operating unit 70 is the short-push operation, the driving support ECU 10 restarts/resumes the traveling control using the stored speed. On the other hand, when the resume/speed-increasing switch 73 is turned ON and this operation of the cruise operating unit 70 is the long-push operation, the driving support ECU 10 sets the target speed to the speed limit recognized by the speed limit acquisition ECU 20, and restarts/resumes the traveling control.

Figure 11:
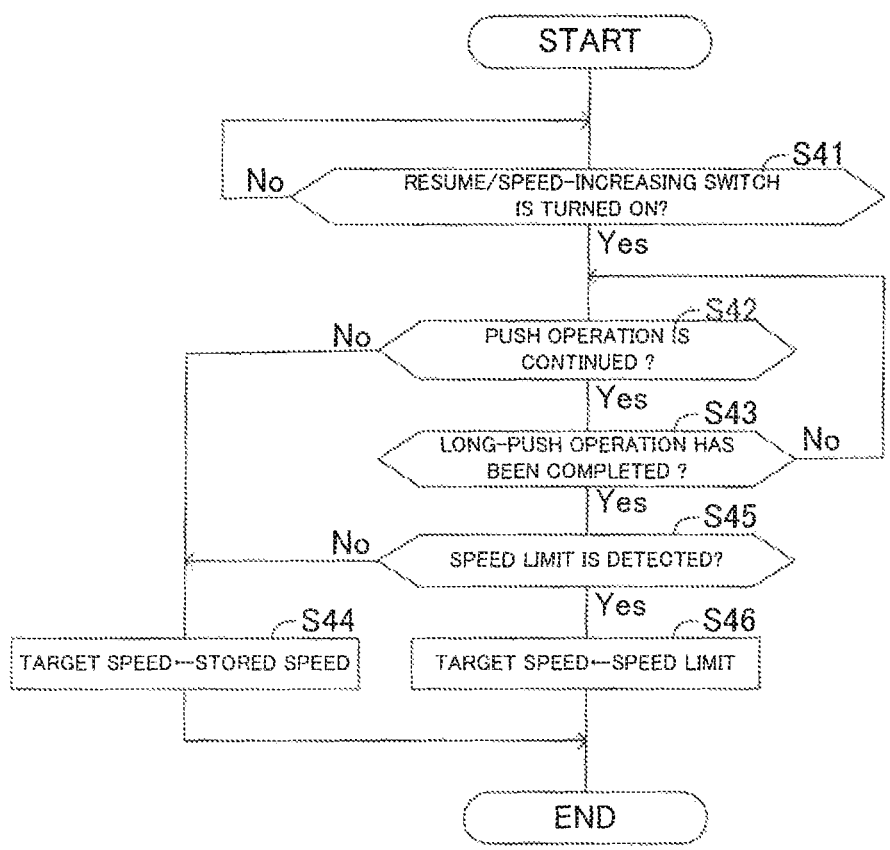
FIG. 11 is a flowchart illustrating a target speed setting routine at the time of restarting a traveling control.

FIG. 11 illustrates the target speed setting routine executed by the driving support ECU 10 at the time of restarting the traveling control. The driving support ECU 10 executes the target speed setting routine shown in FIG. 11 while the traveling control is stopped due to the ON operation of the cancel switch 75.

At step S41, the driving support ECU 10 determines whether or not the resume/speed-increasing switch 73 of the cruise operating unit 70 has just been turned ON by the push operation. The driving support ECU 10 repeats the determination process at step S41 every time the predetermined calculation cycle elapses, and waits until the resume/speed-increasing switch 73 is turned ON. Since the resume/speed-increasing switch 73 is turned ON by the upward push operation of the cruise operating unit 70, hereinafter, ON/OFF of the resume/speed-increasing switch 73 is expressed using the presence or absence of the upward push operation of the cruise operating unit 70.

When the upward push operation of the cruise operating unit 70 is detected, at step S42, the driving support ECU 10 determines whether or not the push operation is being continued. When the upward push operation of the cruise operating unit 70 is being continued, at step S43, the driving support ECU 10 determines whether the upward push operation of the cruise operating unit 70 has been completed/confirmed as the long-push operation. That is, the driving support ECU 10 determines whether or not the ON-duration time of the resume/speed-increasing switch 73 is equal to or longer than the long-push completion time.

When the push operation of the cruise operating unit 70 has not been completed/confirmed as the long-push operation (S43:No), the driving support ECU 10 returns the process to step S42, and repeats the above-described process every time the predetermined calculation cycle elapses. If the push operation of the cruise operating unit 70 is terminated before the long-push operation has been completed/confirmed (S42:No), that is, if the operation of the cruise operating unit 70 is the short-push operation, at step S44, the driving support ECU 10 sets, as the target speed, the stored speed which is the target speed stored at the time when the cancel switch 75 was turned ON (i.e., it sets the target speed to the stored speed).

On the other hand, when the push operation of the cruise operating unit 70 has been completed/confirmed as the long-push operation at step S43 (when it is determined that the duration of time during which the push operation of the cruise operating unit 70 is continued is equal to or longer than the long-push completion time), the driving support ECU 10 determines whether or not the speed limit has been detected at step S45. When the speed limit has been detected by the speed limit acquisition ECU 20, at step S46, the driving support ECU 10 sets the target speed to the speed limit. On the other hand, when the speed limit acquisition ECU 20 has not detected the speed limit (S45:No), the driving support ECU 10 advances the process to step S44.

After the target speed is set in this way, the driving support ECU 10 ends the present target speed setting routine for restarting the traveling control. The driving support ECU 10 restarts the traveling control (ACC or CC) using the target speed set in the above-described target speed setting routine.

According to the modification 2, the driver can, depending on the operation for restarting the traveling control, select the target speed at the time of restarting the traveling control from the target speed (i.e. the stored speed) at the time of terminating the previous traveling control and the speed limit which has been detected by the speed limit acquisition ECU 20. Therefore, the driver who intends to keep the own vehicle traveling at a constant speed in accordance with the target speed does not have to perform the accept operation after the constant speed control is started. As a result, usability/operability can be improved.

In the modification 2, the target speed at the time of restarting the traveling control is set in response to the way of the operation (long-push operation or short-push operation) of the cruise operating unit 70. Alternatively, the driving support ECU 10 may be configured to allow the driver to select the target speed for restarting the traveling control from the stored speed and the speed limit, depending on the operation of the initial setting operation unit 52 operated by the driver. For example, when a specific operation (initial setting operation) is performed using the initial setting operation unit 52, the meter ECU 50 displays a selection screen for starting the traveling control on the display device 51, and transmits to the driving support ECU 10 information on the speed (the stored speed or the speed limit) selected using the initial setting operation unit 52. Thereafter, the driving support ECU 10 restarts the traveling control using the target speed included in the information transmitted from the meter ECU 50.

<Modification 3>

In the above-described embodiment, the unit change amount (e.g., 5 km/h) when changing (increasing or decreasing) the target speed through one long-push operation of the cruise operating unit 70, and the unit change amount (e.g., 1 km/h) when changing (increasing or decreasing) the target speed through the short-push operation of the cruise operating unit 70 are fixed. In contrast, those unit change amounts may be changed in accordance with the magnitude of the speed deviation $\Delta V$, respectively. For example, when the speed deviation $\Delta V$ is relatively large, it is not necessary to change the target speed slightly (by a small unit change amount) in most cases. Therefore, the driving support ECU 10 determines whether or not the speed deviation ΔV is higher than a threshold B, and sets the unit change amount when the long-push operation is detected and/or the unit change amount when the short-push operation is detected to a higher value(s) in a case where the speed deviation ΔV is higher than the threshold B as compared to a case where the speed deviation ΔV is lower than or equal to the threshold B. For example, when the speed deviation ΔV is equal to or smaller than the threshold B, the unit change amounts may be the same amounts as the above described embodiment (that is, the unit change amount when the long-push operation is detected may be 5 km/h, and the unit change amount when the short-push operation is detected may be 1 km/h). In contrast, when the speed deviation ΔV is higher than the threshold B, the unit change amount when the long-push operation is detected may be 10 km/h, and the unit change amount when the short-push operation is detected may be 5 km/h. This modification can improve usability of the apparatus regarding the operation for adjusting the target speed.

Further, the driving support ECU 10 may be configured to allow the driver to select those unit change amounts depending on the operation of the initial setting operation unit 52 by the driver. In this configuration, the meter ECU 50 may transmit to the driving support ECU 10 information on the unit change amount(s) which has (have) been selected by the driver, and the driving support ECU 10 may increase or decrease the target speed using the unit change amount(s).

<Application to ASL>

The embodiments described as above is the vehicle traveling control apparatus configured to control the driving force and the braking force of the own vehicle so as to keep the own vehicle traveling at a constant speed in accordance with the speed limit. Instead of the embodiments, the present invention may be applicable to a vehicle traveling control apparatus which sets an upper vehicle speed limit that is an upper limit of the vehicle speed based on the speed limit, and controls the driving force and the braking force in such a manner that the vehicle speed does not exceed the upper vehicle speed limit. The vehicle traveling control apparatus in this modified example is a vehicle speed limiting apparatus which is referred to as an "ASL (Adjustable Speed Limiter)". In this modified example, the vehicle traveling control apparatus shown in FIG. 1 includes a driving support ECU 10' as substitute for the driving support ECU 10, and an ASL operating unit 70' as substitute for the cruise operating unit 70.

The driving support ECU 10' is connected to the ASL operating unit 70'. The ASL operating unit 70' includes the similar configuration to the cruise operating unit 70. The resume/speed-increasing switch 73 and the set/speed-reduction switch 74 are used for setting the upper speed limit in place of the target speed. Hereafter, the upper vehicle speed limit for the ASL is referred to as an "upper limit for ASL". In addition, the speed limit recognized by the speed limit acquisition ECU 20 is referred to as a "speed limit". The resume/speed-increasing switch 73 and the set/speed-reduction switch 74 are used to set the upper limit for ASL in the same manner as they are used to set the target speed in the above embodiments. Accordingly, the function of the ASL operating unit 70' can be understood by replacing the "target speed" in the description of the embodiments with the "upper limit for ASL", and thus, detailed descriptions of the unit 70' will be omitted. In this modified example, the mode switch 76 is not necessary.

For example, the tap-down operation (the downward short-push operation) of the ASL operating unit 70' functions to reduce the upper limit for ASL by a predetermined speed (for example, 1 km/h). The tap-up operation (the upward short-push operation) of the ASL operating unit 70' functions to increase the upper limit for ASL by a predetermined speed (for example, 1 km/h). Further, the coast operation (the downward long-push operation) of the ASL operating unit 70' functions to gradually reduce the upper limit for ASL at a predetermined speed interval (for example, 5 km/h). The acceleration operation (the upward long-push operation) of the ASL operating unit 70' functions to gradually increase the upper limit for ASL at a predetermined speed interval (for example, 5 km/h). In addition, the definitions of the "long-push operation" and the "short-push operation" are the same as those of the above-described embodiment.

The driving support ECU 10' is an electronic control apparatus that determines the upper limit for ASL which is the upper limit of the running speed of the vehicle based on the speed limit output from the speed limit acquisition ECU 20 and a switch signal output from the ASL operating unit 70'. When the main switch 72 of the ASL operating unit 70' is in the ON state, the driving support ECU 10' executes the vehicle speed limiting control. On the other hand, when the main switch 72 of the ASL operating unit 70' is in the OFF state, the driving support ECU 10' does not execute the vehicle speed limiting control. In addition, the vehicle speed limiting control itself is performed by the engine ECU 30. Therefore, the driving support ECU 10' transmits to the engine ECU 30 information on the upper limit for ASL used for the vehicle speed limiting control to thereby have the engine ECU 30 execute the vehicle speed limiting control.

While the driving support ECU 10' transmits the upper limit for ASL to the engine ECU 30 every time a predetermined cycle elapses, the engine ECU 30 controls the driving force of the engine 31 in such a manner that the vehicle speed of the own vehicle does not exceed the upper limit for ASL. That is, the engine ECU 30 executes the vehicle speed limiting control. The engine ECU 30 calculates the driving force required by the driver based on the vehicle speed (referred to as an "actual vehicle speed") detected by a vehicle speed sensor (one of the sensors 33) and an accelerator pedal operation amount detected by an accelerator pedal sensor (one of the sensors 33). Then, the engine ECU 30 controls the engine 31 and the transmission 32 so as to generate the required driving force. In this case, when it is predicted that the actual vehicle speed exceeds the upper limit for ASL, the engine ECU 30 decreases the opening degree of a throttle valve that adjusts an intake air amount of the engine 31, or limits a fuel injection amount to the engine 31, or adjusts the gear ratio of the transmission 32, in such a manner that the actual vehicle speed does not exceed the upper vehicle speed limit. Further, when the required driving force has a value requiring a large braking force, and the engine 31 and the transmission 32 alone cannot satisfy the required driving force, the engine ECU 30 transmits information on the required braking force to the brake ECU 40 so as to compensate for the shortage by a hydraulic brake.

The ASL operating unit 70' is not only used for increasing/decreasing the upper limit for ASL, but also used as an operating apparatus for permitting the driver to set the upper limit for ASL to the speed limit. When the ASL operating unit 70' is operated so as to authorize the driving support ECU 10' to set the upper limit for ASL to the speed limit, the driving support ECU 10' sets the upper limit for ASL to the speed limit recognized by the speed limit acquisition ECU 20.

When the main switch 72 is in the ON state, the driving support ECU 10' executes an accept prohibition flag setting routine, a display switching control routine, and a ASL upper limit setting routine. The accept prohibition flag setting routine in this example includes processes similar to the processes of the accept prohibition flag setting routine described above (FIG. 6) in which the "target speed" is replaced with the "upper limit for ASL", and the "cruise operating unit" is replaced with the "ASL operating unit". Further, the display switching control routine in this example includes processes similar to the processes of the display switching control routine described above (FIG. 7) in which the "target speed" is replaced with the "upper limit for ASL", and the "cruise operating unit" is replaced with the "ASL operating unit". Further, the ASL upper limit setting routine in this example includes processes similar to the processes of the target speed setting routine described above (FIG. 8) in which the "target speed" is replaced with the "upper limit for ASL", and the "cruise operating unit" is replaced with the "ASL operating unit". Therefore, detailed descriptions on those routines are omitted.

When the speed deviation ΔV which is a magnitude of a deviation between the upper limit for ASL and the speed limit is equal to or smaller than a threshold (>0), the driving support ECU 10' regards/treats the long-push operation of the ASL operating unit 70' in the accept direction not as the accept operation, but as the acceleration operation or the coast operation. Therefore, the driver can set the upper limit for ASL to a desired value with a simple operation and in a short time.

When the speed deviation ΔV is equal to or smaller than the threshold A, the normal display screen D1 is displayed as substitute for the inquiry display screen D2. In this example, the normal display screen D1 is a screen displaying the upper limit for ASL as substitute for the target speed in the normal display screen D1 shown in FIG. 3, and the inquiry display screen D2 is a screen displaying the upper limit for ASL as substitute for the target speed in the inquiry display screen D2 shown in FIG. 3. Therefore, the displayed screen matches up with (corresponds to) the function (the acceleration operation or the coast operation) of the long-push operation of the ASL operating unit 70'. That is, when the function of the long-push operation of the ASL operating unit 70' is the acceleration operation or the coast operation, the inquiry display screen D2 is not displayed so as not to provide/present the guidance of the acceptance-response-operation to the driver. Therefore, it is possible to prevent the driver from feeling discomfort.

Further, the driving support ECU 10' may execute processes similar to the processes of the above modifications 1 to 3 in which the "target speed" is replaced with the "upper limit for ASL".

<Other Modifications>

In the present embodiments, the accept directions are the upward direction and the downward direction, but they are not limited to such directions. For example, the accept directions may be other directions such as a left direction and a right direction viewed from the driver, or a front direction and a backward direction viewed from the driver. In this case, when the speed limit is higher than the current target speed (or upper limit for ASL), it is preferable that the accept operation direction be set to the same direction as the operation direction of the operating unit 70 (70') for increasing the target speed (or upper limit for ASL). On the other hand, when the speed limit is lower than the current target speed (or upper limit for ASL), the accept operation direction may be set to the same direction as the operation direction of the operating unit 70 (70') for decreasing the target speed (or upper limit for ASL).

Further, each of the vehicle traveling control apparatuses of the present embodiments is an apparatus which implements RSA-ACC, but may be an apparatus in which the inter-vehicle control function is omitted (that is, an apparatus which implements RSA-CC).

Further, in the present embodiments, a lever type of the operating unit 70 (70') is adopted. However, it is not necessarily required that the operating unit 70 (70') is the lever type. The operating unit 70 (70') may be a button type, a sliding type, or other types. Further, the operating unit 70 (70') may be provided at a position that the driver can operate during driving, for example, at a pad portion of a steering handle.

What is claimed is:

1. A vehicle traveling control apparatus for a vehicle, the vehicle traveling control apparatus comprising:
    a cruise control configured to keep the vehicle traveling at a constant speed in accordance with a target speed without an accelerator pedal operation by a driver;
    an operating lever which is operated by the driver to increase or decrease the target speed to an arbitrary value;
    at least one processor programmed to:
        acquire a speed limit of a road on which the vehicle travels;
        display the target speed and the speed limit on a display device;
        perform a first function to increase or decrease the target speed by a predetermined change amount every time a certain time elapses while a push operation of the operating lever continues after a long-push operation is detected, and a second function to set the target speed to the speed limit when the long-push operation of the operating lever is detected, the long-push operation being a push operation of the operating lever which continues for a long-push completion time;
        acquire a speed deviation which is a magnitude of a deviation between the speed limit and the target speed;
        set the target speed through the first function when the speed deviation is equal to or smaller than a predetermined threshold which is larger than zero at a time point at which the long-push operation is detected; and
        set the target speed through the second function when the speed deviation is larger than the threshold at the time point at which the long-push operation toward a side bringing the target speed closer to the speed limit is detected.

2. The vehicle traveling control apparatus according to claim 1,
    wherein, when the target speed is set through the first function, the processor is further programmed to:
        increase or decrease the target speed by the predetermined change amount in such a manner that the target speed becomes one of multiples of the predetermined change amount; and
        set the target speed to a value which is closest to one of the multiples in a changing direction of the target speed, if the target speed at a time point of starting the push operation of the operating lever is not one of the multiples, and wherein the threshold is set to be a value which is the same as the predetermined change amount.

3. The vehicle traveling control apparatus according to claim 1, wherein the at least one processor is further programmed to:

change the threshold to one of values including at least zero in response to an operation of the driver.

4. The vehicle traveling control apparatus according to claim 1, wherein the operating lever is configured to perform a function to stop the cruise control in response to an operation of the driver, and perform a function to restart the cruise control which has been stopped, in response to an operation of the driver, and the at least one processor is further programmed to:

store the target speed at a time point at which the cruise control is stopped;

set the target speed at a time point at which the cruise control is restarted to the speed limit, when the cruise control is restarted in response to the long-push operation of the operating lever; and set the target speed at the time point at which the cruise control is restarted to the stored target speed, when the cruise control is restarted in response to a short-push operation of the operating lever which is a push operation which is terminated before the long-push completion time elapses.

5. The vehicle traveling control apparatus according to claim 1, wherein the at least one processor is further programmed to:

display on the display device an operation instruction indicating operation procedures of the operating lever for setting the target speed to the speed limit; and prohibit display of the operation instruction when the speed deviation is equal to or smaller than the threshold.

6. A vehicle traveling control apparatus for a vehicle, the vehicle traveling control apparatus comprising:

at least one processor programmed to control a driving force and a braking force of the vehicle in such a manner that a vehicle speed of the vehicle does not exceed an upper speed limit;

an operating lever which is operated by the driver to increase or decrease the upper speed limit to an arbitrary value, wherein the at least one processor is further programmed to:

acquire a speed limit of a road on which the vehicle travels;

display the upper speed limit and the speed limit on a display device;

perform a first function to increase or decrease the upper speed limit by a predetermined change amount every time a certain time elapses while a push operation of the operating lever continues after a long-push operation is detected, and a second function to set the upper speed limit to the speed limit when the long-push operation of the operating lever is detected, the long-push operation being a push operation of the operating lever which continues for a long-push completion time;

acquire a speed deviation which is a magnitude of a deviation between the speed limit and the upper speed limit;

set the upper speed limit through the first function when the speed deviation is equal to or smaller than a predetermined threshold which is larger than zero at a time point at which the long-push operation is detected; and set the upper speed limit through the second function when the speed deviation is larger than the threshold at the time point at which the long-push operation toward a side bringing the upper speed limit closer to the speed limit is detected.

* * * * *